US008682290B2

(12) United States Patent
Pousti

(10) Patent No.: US 8,682,290 B2
(45) Date of Patent: *Mar. 25, 2014

(54) SYSTEMS AND METHODS FOR AUTOMATIC GENERATION, REGISTRATION AND MOBILE PHONE BILLING OF A POD USING THIRD PARTY WEB PAGE CONTENT

(71) Applicant: SMS.ac, Inc., San Diego, CA (US)

(72) Inventor: Michael C. Pousti, San Diego, CA (US)

(73) Assignee: SMS.ac, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/743,248

(22) Filed: Jan. 16, 2013

(65) Prior Publication Data
US 2013/0130645 A1 May 23, 2013

Related U.S. Application Data

(63) Continuation of application No. 13/304,250, filed on Nov. 23, 2011, now abandoned, which is a continuation of application No. 12/911,662, filed on Oct. 25, 2010, now abandoned, which is a continuation of application No. 11/751,538, filed on May 21, 2007, now Pat. No. 7,835,720, which is a continuation-in-part of application No. 11/516,921, filed on Sep. 6, 2006, now Pat. No. 7,826,829.

(60) Provisional application No. 60/802,255, filed on May 19, 2006.

(51) Int. Cl.
*H04W 4/24* (2009.01)

(52) U.S. Cl.
USPC .................................. 455/406; 705/39

(58) Field of Classification Search
USPC ........... 455/414, 406, 419; 707/802; 709/203, 709/217
See application file for complete search history.

(56) References Cited

U.S. PATENT DOCUMENTS

| | | | | |
|---|---|---|---|---|
| 5,566,291 | A * | 10/1996 | Boulton et al. | 715/709 |
| 7,283,981 | B2 * | 10/2007 | Solem | 705/42 |
| 7,835,720 | B2 * | 11/2010 | Pousti | 455/406 |
| 2001/0054003 | A1 * | 12/2001 | Chien et al. | 705/14 |
| 2002/0107795 | A1 * | 8/2002 | Minear et al. | 705/40 |
| 2002/0194126 | A1 * | 12/2002 | Randell et al. | 705/40 |
| 2004/0006539 | A1 * | 1/2004 | Royer et al. | 705/40 |
| 2004/0043753 | A1 * | 3/2004 | Wake et al. | 455/406 |
| 2004/0181591 | A1 * | 9/2004 | Yu et al. | 709/217 |
| 2005/0240943 | A1 * | 10/2005 | Smith et al. | 719/328 |
| 2005/0289047 | A1 * | 12/2005 | Oliver et al. | 705/39 |
| 2006/0026105 | A1 * | 2/2006 | Endoh | 705/59 |
| 2006/0200420 | A1 * | 9/2006 | Osada | 705/59 |
| 2006/0259427 | A1 * | 11/2006 | Randell et al. | 705/40 |
| 2006/0276171 | A1 * | 12/2006 | Pousti | 455/405 |
| 2007/0244811 | A1 * | 10/2007 | Tumminaro | 705/39 |

(Continued)

*Primary Examiner* — Kashif Siddiqui
(74) *Attorney, Agent, or Firm* — Procopio, Cory, Hargreaves & Savitch LLP; Noel C. Gillespie

(57) ABSTRACT

The systems and methods described herein generally relate to a method and system for automatically generating an application pod for a third party through which the third party's content is offered for access, purchase and use by mobile phone users within a community network. More specifically, the systems and methods described herein are directed to an application pod that can be automatically generated based on content and information retrieved from one or more web pages of the third party.

1 Claim, 24 Drawing Sheets

(56) References Cited

U.S. PATENT DOCUMENTS

| | | | |
|---|---|---|---|
| 2007/0255620 A1* | 11/2007 | Tumminaro et al. | 705/14 |
| 2007/0255652 A1* | 11/2007 | Tumminaro et al. | 705/39 |
| 2007/0265972 A1* | 11/2007 | Tsutsui | 705/52 |
| 2007/0288370 A1* | 12/2007 | Konja | 705/41 |
| 2011/0093508 A1* | 4/2011 | Pousti | 707/802 |

* cited by examiner

FIG. 5 sms.ac™
*always connected*

Home | Get Started | Payout | Reports | Support | FAQ's | Directory | Member Sign Out
| Build | | | | | Tech Specs | Security

② Build Mobile Products

Select ⟩ Build ⟩ Complete

MobilePartner 👋

Mobile Product Details

| | |
|---|---|
| Product Type: | [Mobile Pod ▽] — 802 |
| Name: | [TEST POD] — 804 |
| Short Description: | [This is the TEST POD !] ⓘ — 806 |
| Characters Left: [94] | |
| Long Description: | [Lorem ipsum ! Lorem ipsum ! Lorem ipsum ! Lorem ipsum !] ⓘ — 808 |
| Logo URL: | [http://www.sms.ac/logo.jpg] ⓘ — 810 |
| Product URL: | [http://www.sms.ac/byop.html] ⓘ — 812 |
| Author Name: | [SMS.ac] — 814 |
| Pricing: | [Tariff 25 ▽] ⓘ Pay Out — 816 |
| Number of Messages: | [2 ▽] Sent per [Week ▽] ⓘ — 818 |

```
TEST POD
This is the TEST POD!
                            Amount Per Serving
Price Per Message           Tariff 25
Number of Messages          2
Sent Per                    Week
Category                    Sports & Recreation
Your mobile phone will be charged.
```
— 820

FIG. 8A

Product URL: http:// ⃞ ⃝?
Author Name: ⃞
Pricing: Tariff 25 ▽ ⃝?
Number of Messages: 1 ▽ Sent Per Month ▽
Adult (18+): ☐
Content: ⃝? content guidelines —— 822
Optional Fields:

| Field Name | Type | Value | Required |
|---|---|---|---|
| Pizza | TextField ▽ | Pizza | ☑ |
| City | DropDownList ▽ | New York, San Diego, Detroit | ☑ —— 824 |
| Team | Radio ▽ | Padres, Yankees, Tigers | ☑ | add more fields

Mobile Directory
Category: Sports & Recreation ▽ ⃝? —— 826

Save Pod | Clear

Revenue Calculator
Understand the potential earnings of your messages!
Messages Sent (monthly) per user: 1
Sent to -- Country: United States ▽  Carrier: Cingular-Wireless ▽
Revenue per msg: 0.165  Number of Users: 234  Cost per User per Month: $0.3
Monthly Potential Revenue Revenue Share=$38.61  Calculate

—— 828

*Mobile Products*  AVAILABLE PRODUCTS BY THIS DEVELOPER

| | Product Name | Product Type | Description | Max | Pricing | Status | Manage |
|---|---|---|---|---|---|---|---|
| ☐ | funny mobile pod! | Mobile Pod | This is the funniest pod ever!!! | 4 | 1 | Active | Edit |

Deactivate Selected Products

—— 830

FIG. 8B sms.ac™
*Pod Developer*

Welcome Andy    Sign Out

Pod Developer Home | Start-Up Checklist | Build Pod | Reporting | Developer Forum | Marketing[NEW] | Help Center | Wizards

Blog and Publishing Wizard  Step 1: Enter Blog Pod Information

Blog Pod Publishing Wizard    [1] Enter Blog Pod Info  [2] Set Pricing  [3] Review & Publish To publish your Blog Pod, please provide the information below. You will be notified within 48 hours of the status of your Pod submission. If your Pod is approved, it will be posted on the SMS.ac Mobile Directory and become available for subscription by our users.

Once your Blog Pod is active, you will be able to update its content directly from your Blog site, and the changes will automatically be reflected on the user's Mobile Homepage.

Blog Pod Information

The information below will be visible to all users. This information should market your Pod, make it desirable and clearly state the value of your Pod.

*Blog: [                    ]
* Short Description: [                    ]
115 Characters Remaining

*Long Description: [                    ]

Enter a short easy-to-remember name for your Pod, Your Pod name is your first interface with your potential subscribers, it should educate the user of the content of your Pod.

Blog Information

Mobile Directory Logo URL: [                    ]

*Select Blog Provider: [             ▽]

This logo will be displayed with your Pod Information in the Mobile Pod Directory. To stand out from other Pods offered in the directory, your logo should be visually pleasing and catch the users eye. The file must be .jpg, .gif or .png format with 112px W x 112px H. The logo will also appear in the users Pod storage area, or Pod Bucket.

Blog User Details

*User ID: [                    ]

Password: [                    ]

Note: Password is only required for Blogger users.

Adult Content?

[ ]  * My blog will not contain any adult content.

FIG. 18

[Next: Set Pricing]    [1] Enter Blog Pod Info  [2] Set Pricing  [3] Review & Publish sms.ac™
*Pod Developer*

Welcome Andy                           Sign Out

Pod Developer Home | Start-Up Checklist | Build Pod | Reporting | Developer Forum | Marketing[NEW] | Help Center | Wizards

Blog and Publishing Wizard  Step 2: Set Pricing

Set Consumer Pricing Level        [1] Enter Blog Pod Info  [2] Set Pricing  [3] Review & Publish Users can be charged a monthly fee to subscribe to your Pod, and a Pod Alert fee for the messages it sends to their mobile phones. Use the sections below to determine these charges for your Pod.

Monthly Mobile Subscription (?)

Users subscribe to your Pod and add it to their Mobile Homepages. You should consider the total cost and value of your Pod when setting the pricing level. If your Pod includes alerts sent to the users phone, you might consider setting a lower subscription pricing level. If your Pod does not generate any alerts, you might want to consider a higher subscription fee.

Pricing Levels  [1.00 ▽]

[ ] Daily Value Added Alerts (?)

If you Pod generates message alerts, the users will also be charged according to the pricing level you determine below and the number of messages they receive. You can select up to a maximum of 20 messages per day. You are not required to send any daily alerts, but you must set the maximum number of daily messages you might send. International pricing is determined by industry standards, based on social and economic indexes.

Max Message Daily:  [1 ▽]
   Pricing Levels:  [0.25 ▽]

[< Back]  [Next: Review & Publish]       [1] Enter Blog Pod Info  [2] Set Pricing  [3] Review & Publish

FIG. 19 sms.ac™
*Pod Developer*

Welcome Andy　　　　　　　　　　　　　　Sign Out

Pod Developer Home | Start-Up Checklist | Build Pod | Reporting | Developer Forum | Marketing^NEW | Help Center | Wizards

Blog and Publishing Wizard  Step 3: Review and Publish

Review and Publish Your Blog Pod　[1] Enter Blog Pod Info　[2] Set Pricing　[3] Review & Publish

Before you click Submit, be sure to review this page and go back to make any necessary changes. You will be notified of your Pod's status by SMS.ac within 48 hours.

Mini Blog Icon Preview　　Blog Pod Preview
　　　　　　　　　　　　　(Directory View)

| andy blog | |
|---|---:|
| | Amount per Serving |
| Company | SMS.ac Pod Company |
| Location | Worldwide |
| Language | Language |
| Users | 0 |
| Created on | 3/7/2006 |
| Pricing | |
| | Amount per Serving |
| Subscription | $0.99/month |
| Daily Alerts | n/a |
| Max Messages Daily | n/a |
| Your mobile phone will be charged. | |

Confirmation Text

Be sure you...

- Pod has successfully tested in your development environment, as well as our Build Your Own Pod test page after you submit your Pod, it will be marked "WIP (Work in Progress)" until it is approved.
- Mobile Pod Directory Logo looks good.  If it doesn't, check to makes sure it's a .jpg, .gif, or .png file type with maximum dimensions of 112px H x 112px W.
- Mobile Pod Directory Information is accurate.  If it doesn't, go back and verify your product information and pricing settings.

[< Back]　[Next: Review & Publish]　　　[1] Enter Blog Pod Info　[2] Set Pricing　[3] Review & Publish

FIG. 20 budkie

Sat, 24 Jul 2004 01:20:08 CMT

Saturday, July 24, 2004

I scallywag tagged it up again today, pulled 4th and fifth. Managed to shoot 900 shoots the second game. Hung out with cata tonight (that included the scallywagatude) we also went to graters sadly kai wasn't there to mess up our order, oh well.

by
Go there

Previous                    Next

FIG. 21

SYSTEMS AND METHODS FOR AUTOMATIC GENERATION, REGISTRATION AND MOBILE PHONE BILLING OF A POD USING THIRD PARTY WEB PAGE CONTENT

RELATED APPLICATIONS INFORMATION

This application claims the benefit of priority as a Continuation under 35 U.S.C. §120 of U.S. patent application Ser. No. 13/304,250, filed Nov. 23, 2011 and entitled "Systems and Methods for Automatic Generation, Registration and Mobile Phone Billing of a Pod Using Third Party Web Page Content," which in turn claims priority as a Continuation under U.S.C. §120 of U.S. patent application Ser. No. 12/911,662, filed Oct. 25, 2010 and entitled "Systems and Methods for Automatic Generation, Registration and Mobile Phone Billing of a Pod Using Third Party Web Page Content," which in turn claims priority as a Continuation under 35 U.S.C. §120 of U.S. patent application Ser. No. 11/751,538 (now U.S. Pat. No. 7,835,720), filed May 21, 2007 and entitled "Systems and Methods for Automatic Generation, Registration and Mobile Phone Billing of a Pod Using Third Party Web Page Content," which in turn claims the benefit under 35 U.S.C. §119(e) to U.S. Provisional Patent Application Ser. No. 60/802,255, filed May 19, 2006 and entitled "Automatic Generation Of Application Pod Using Third Party Web Page Content," and also claims the benefit as a Continuation-In-Part (CIP) under 35 U.S.C. §120 to U.S. patent application Ser. No. 11/516,921 (now U.S. Pat. No. 7,826,829), filed on Sep. 6, 2006, entitled "Automated Billing and Distribution Platform For Application Providers," all of which are incorporated herein by reference in their entirety as if set forth in full.

This application is also related to co-pending U.S. patent Application Ser. No. 11/715,401, filed Mar. 8, 2007, entitled 'Automatic Generation of Pod Application," and co-pending U.S. patent Ser. No. 11/688,714, filed Mar. 20, 2007, entitled "Systems and Methods for Generation, Registration and Mobile Phone Billing of a Music Pod System," both of the which are incorporated herein for all purposes.

BACKGROUND INFORMATION

1. Field

The embodiments described below relate to an automated distribution and billing platform for networked applications, and, more particularly, relates to a micro-transaction billing platform through which transactions are conducted for the access and use of networked applications by mobile phone users.

2. Background

While credit card use and automatic credit card billing is a common way to conduct business transactions in many countries, they are not necessarily the best way in some situations. In particular, there are many users of the internet that do not have access to a credit card or do not want to use their credit card for an internet based transaction out of security concerns. Many such users most likely have a mobile phone or mobile device, and it would be easy and efficient to have a mechanism for billing the user for transactions through the user's pre-existing account with the wireless network carrier associated with the user's mobile phone number. In addition, the use of a credit card is economically viable only if the transaction amount, or a volume of such transactions, exceeds a particular amount that depends on the underlying efficiency of the billing and collecting system implemented by the merchant and by the credit card provider. Currently, wireless network carriers routinely bill users for small transactional amounts, such as a one minute call, or portion thereof, and are able to bill and collect for these small transactions while making a profit. These small transactions are referred to as micro-transactions and, in terms of U.S. currency, can be as small as a few pennies, although larger transactions occur as well.

Retailers or vendors, such as internet commercial websites that provide products or services, may desire to provide their respective content or services to mobile phone users via the internet or directly through the user's mobile phone, and bill the user for such content or services as micro-transactions. For example, a third-party internet website may provide users with access to frequent summaries of sports game scores and news or other premium content, for a fixed price per month. Currently, a retailer or vendor will find it very difficult and inefficient to bill and collect for such a micro-transaction because the retailer/vendor would need to negotiate and enter into a contractual relationship with the user's wireless network carrier in order to bill the mobile phone user subscribed to that carrier. The process is further complicated by the fact that the universe of customers with mobile phones use different wireless network carriers. Accordingly, the retailer/vendor would need to enter into contractual relationships with each of the many different wireless network carriers in order to be able to provide a mobile phone based micro-transaction billing option to the desired global market of mobile phone users. A retailer or vendor can try to use billing mechanisms other than wireless network carriers, such as prepaid card services, web-based payment services, bank account and credit card billing services, and other such external billing mechanisms to support customer transactions. However, in such examples, the same problem still exists for the vendor/retailer because they would still need to have pre-existing relationships with all of the various external billing mechanisms that their various customers wish to use for payment of transactions. In addition, a retailer/vendor often finds it difficult to efficiently market their product/service to the users of each of the many different wireless network carriers.

Thus, there exists a need for retailers and vendors with networked applications to have the ability to easily market and conduct transactions, many of which may be micro-transactions, with a global market of mobile phone users, where the transactions are easily billable through a single intermediate billing platform which can effectuate a transaction through a wide variety of external billing mechanisms on behalf of the retailer/vendor, thereby eliminating the need for the retailer/vendor to establish an individual contractual relationship with each of the external billing mechanisms, while providing the retailer/vendor with efficient access to the global market.

SUMMARY

The systems and methods described herein generally relate to a method and system for automatically generating an application pod for a third party through which the third party's content is offered for access, purchase and use by mobile phone users within a community network. More specifically, the systems and methods described herein are directed to an application pod that can be automatically generated based on content and information retrieved from one or more web pages of the third party.

In this manner, the third party does not need to have the requisite skills and capabilities, time or resources to develop an application pod through which to offer the third party's content, such as a blog, music, video, text, or other digital content, to mobile phone users within the community network.

These and other features, aspects, and embodiments are described below in the section entitled "Detailed Description."

BRIEF DESCRIPTION OF THE DRAWINGS

Features, aspects, and embodiments are described in conjunction with the attached drawings, in which:

FIG. 5 is a block diagram depicting a webpage for developing a network-enabled application, according to one embodiment;

FIG. 8A is a block diagram depicting a first portion of a webpage for entering information related to a network-enabled application, according to one embodiment;

FIG. 8B is a block diagram depicting a second portion of a webpage for entering information related to a network-enabled application, according to one embodiment;

FIG. 18 is a screen shot of an example of a wizard for automatically creating an application pod for a third party to offer a blog by the third party to users of the mobile community;

FIG. 19 is another wizard page for automatically creating a blog application pod in which entry fields are provided for the third party to enter the price level that is to be charged to a user to subscribe to (purchase) the pod;

FIG. 20 is a further wizard page for automatically creating a blog application pod in which a representation of the appearance of the application pod is depicted for the user, along with pricing information, before finally submitting the wizard entries for creation of the application pod;

FIG. 21 depicts an example of a blog application pod created from the wizard of FIGS. 18-20;

DETAILED DESCRIPTION

At least portions of the systems and methods described herein can be implemented on a networked computing system via a network, such as the Internet. An example of such a networked system is described in FIG. 1. The description of the network and computer-based platforms that follows is exemplary. However, it should be clearly understood that the systems and methods described herein can be practiced without the specific details described herein. Well known structures and devices are shown in block diagram form in order to avoid unnecessarily obscuring the systems and methods described herein.

Figure 1:
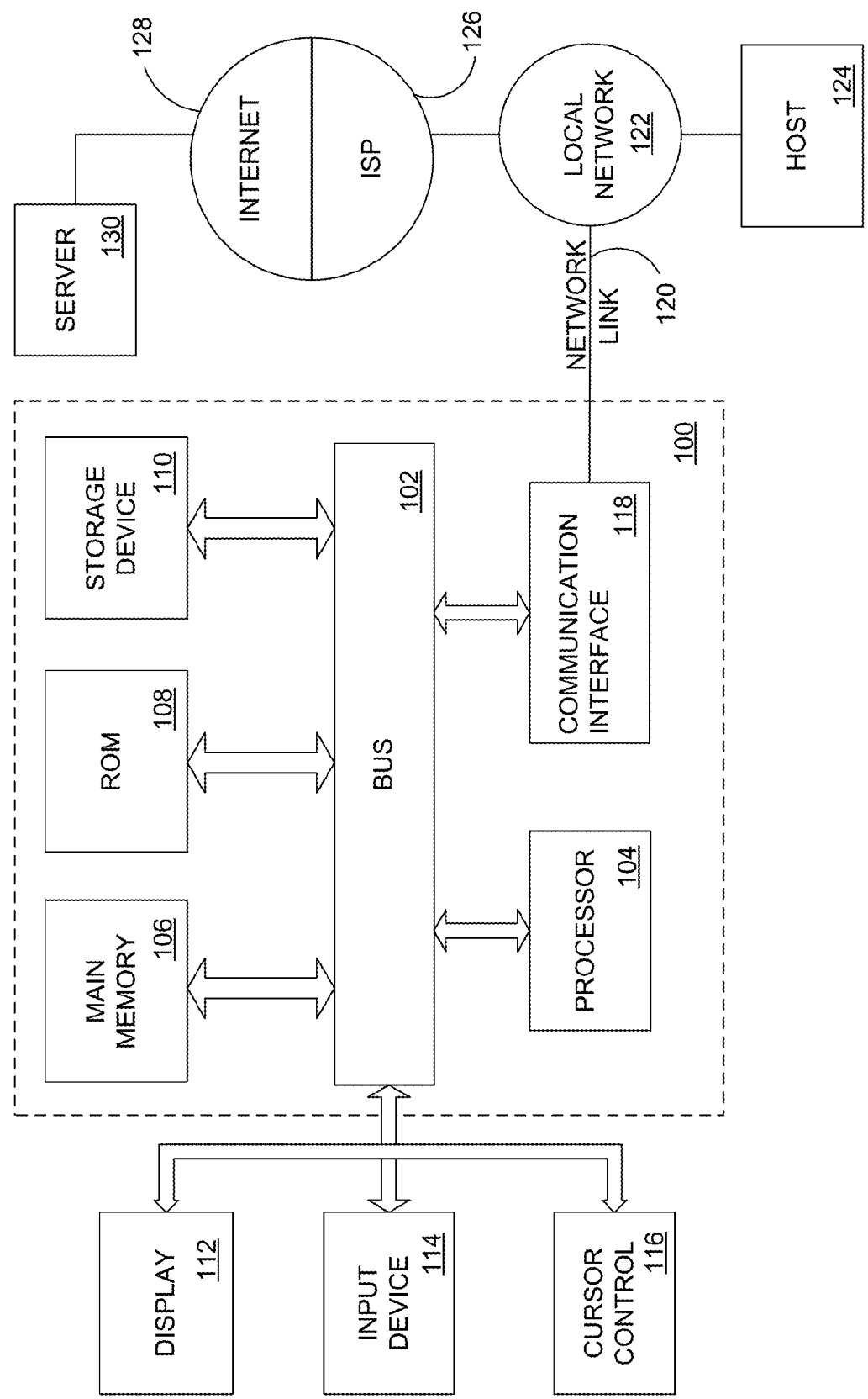
FIG. 1 is a block diagram of a computer system with which the systems and methods described herein can be practiced, according to one embodiment.

FIG. 1 is a block diagram that illustrates a computer system 100 upon which an embodiment can be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

Computer system 100 operates in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hardwired circuitry may be used in place of or in combination with software instructions to implement the systems and methods described herein. Thus, the embodiments described herein should not be seen as limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. The received code may be executed by processor 104 as it is received, and/or stored in storage device 110, or other non-volatile storage for later execution. In this manner, computer system 100 may obtain application code in the form of a carrier wave. Of course, other types and forms a computing systems may be used to practice the systems and methods described herein.

Figure 2:
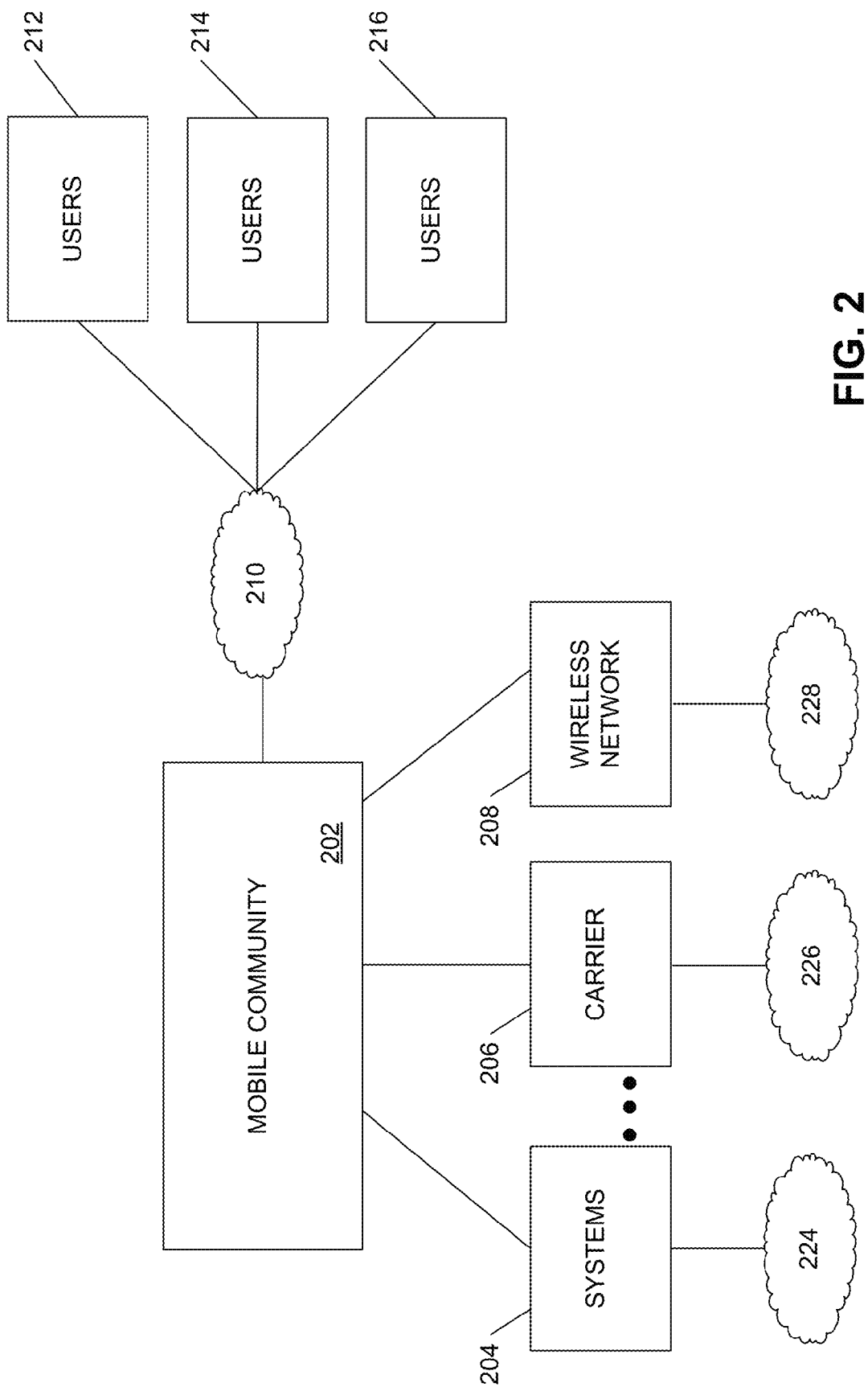
FIG. 2 is a block diagram of a wireless network environment in which the systems and methods described herein can be practiced, according to one embodiment.

FIG. 2 depicts a block diagram of a computer-based platform 202 in which the systems and methods described herein can be practiced, according to one embodiment. Users 212, 214, 216 can connect to platform 202 via a network or similar communications channel 210. Via the connection, a user (e.g., 212) may create a profile page or "home page" that they can personalize. This profile page can include various files and content that the user wants to share with other members of platform 202.

The profile page may include a hierarchy of pages, some of which are for public view and some of which have restrictions on viewing (private). For example, platform 202 can be logically organized into neighborhoods such as "friends", "family", "workplace", "dog owners", etc. Users 212, 214, 216 can belong to these different neighborhoods and share different pages with the members of the different neighborhoods.

As seen in FIG. 2, platform 202 connects with various wireless network carrier systems 204, 206, 208, each of which has an associated community of wireless network subscribers, 224, 226 and 228. In this regard, each of wireless network carrier systems 204, 206, 208 is a carrier network and system for supporting mobile devices including mobile phones and other mobile devices such as personal device assistants (pda). Each wireless network carrier system is generally a wireless network provider, which can be cellular, PCS, or other wireless spectrum. Users 212, 214, 216 of the platform 202 are also subscribers of one or more of the various wireless network carriers, which support the mobile phones, or other mobile devices, of users 212, 214, 216. In this way, users 212, 214, 216 of platform 202 can access other users' profile pages through the computer-based platform of platform 202, and they can also access the subscribers 224, 226 and 228 of the various wireless network carrier systems 204, 206, and 208 who also belong to platform 202.

A significant benefit of the architecture depicted in FIG. 2, is that the platform 202 has pre-existing contractual relationships with the various wireless network carrier systems 204, 206, 208 for accessing subscribers through each carrier systems and for billing subscribers through their respective carrier system for content and services purchased by the subscriber through platform 202. As is known in the art, the wireless network carrier systems 204, 206, 208 provide text messaging and also premium text message functionality. Such messages are sent via the wireless network carrier's infrastructure to its mobile subscribers and, internal to the wireless network carrier's infrastructure, the sending of such a message generates a billing event according to a particular tariff rate, which then is added to the subscriber's bill from that wireless network carrier. In another billing mode, the subscriber is pre-paid by a certain pre-paid amount with the wireless network carrier, and the sending of such a message in this billing mode generates subtracts an amount corresponding to a particular tariff rate from the pre-paid amount of the subscriber's account.

When platform 202 sends a message via a wireless network carrier system (e.g., 204), it is billing the subscriber-recipient of the message using the existing billing system of that wireless network carrier. The billing event is often a micro-transaction of a small monetary amount (e.g., less than one dollar). Thus, a user (e.g., 212) of the platform may purchase a service or content within platform 202 and be billed for those transactions through that user's wireless network carrier service account. The systems and methods described herein provide for such micro-transaction billing support through platform 202 for a transaction between a user (e.g., 212) and an application provider. In this manner, an application provider need only communicate with platform 202 to conduct transactions with users, and does not require any affiliation or agreement with the various wireless network carrier systems of the users. As mentioned above, other billing mechanisms can be used by the platform rather than billing the user through the wireless network carrier of the user, such as prepaid card services, web-based payment services, bank account and credit card billing services, and other such external billing mechanisms to support customer transactions.

Figure 3:
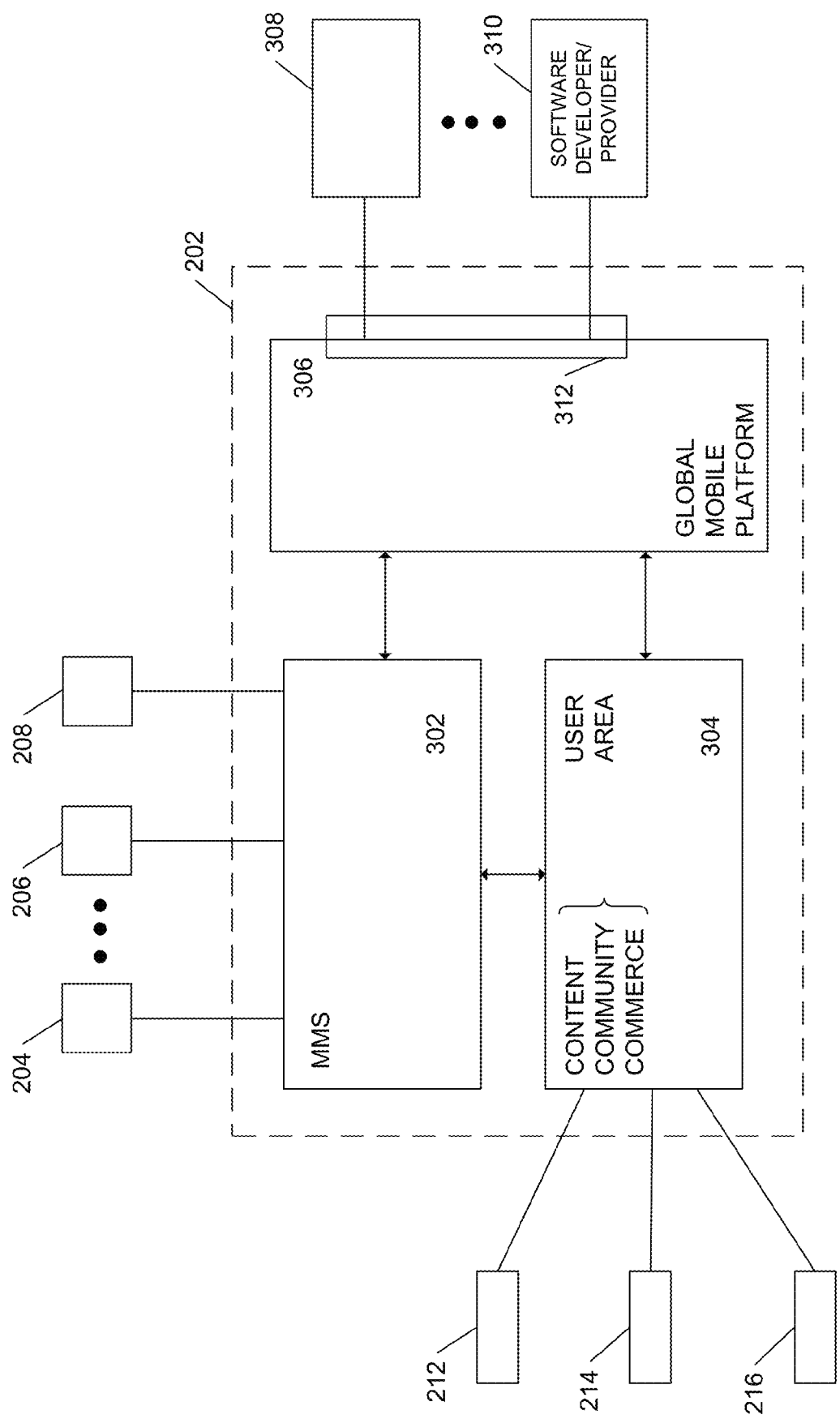
FIG. 3 is a block diagram providing a detailed view of the platform shown in FIG. 2.

FIG. 3 depicts a more detailed view of the high-level system view of FIG. 2. In particular, the system of FIG. 3 can be used to conduct micro-transactions in which a wireless network carrier's billing system is used by the platform 202 to automatically bill the user for each micro-transaction with a vendor/retailer through an application, without the need for a negotiation or contract between the vendor and the wireless network carrier. One example of this feature is that of information distribution where application developers can offer information, such as stock quotes, to the users of the platform 202 through applications while taking advantage of the billing arrangements already in place between the platform 202 and the wireless network carriers 204, 206, 208. Of course, an application may provide any other type of content or service to users of platform 202, such as information, communication, games, etc.

Some of the sub-components of the platform 202 are a developer's interface 306, the user area 304 where the content, community and commerce functions are handled for the users, and a multimedia messaging system (MMS) 302. The details of these different subcomponents are more fully explained throughout the remainder of this detailed description.

As noted earlier, users 212, 214 and 216 can visit the user area 304 to participate in an on-line community that includes various content and commerce opportunities. This is typically accomplished via a user's web browser which may be run from a laptop or desktop computer, or, in the alternative, even on the user's mobile device such as a PDA, mobile phone, or other mobile device. Thus, the user area 304 includes a web server that communicates with users 212, 214, 216 and includes a data store of user information and other content, and also includes databases and records. With these resources, the platform 202 is able to present to a user 212 a profile page ("home page") that reflects content and information associated with, and desired by, that particular user. This content and information is not maintained on the local computer being used by the user 212 but, rather, is maintained and managed by the computer systems within the user area 304.

Although not explicitly depicted in FIG. 3, one of ordinary skill will recognize that there are numerous functionally equivalent techniques to create, manage, store and serve user information, user profiles, user content, software tools and other resources within the user area 304. Included in these techniques are methods to ensure security, data integrity, data availability and quality of service metrics. In the present exemplary embodiment, user 212 is illustrated connecting to user area 304 with a desktop computer, user 214 is illustrated as connecting to user area 304 via a wireless connection (dotted line) from a notebook computer, and user 216 is illustrated as connecting to user area 304 via a wireless connection (dotted line) from a mobile device. As will be apparent to one of ordinary skill in the art, however, the scope of the systems and methods described herein are not limited to these particular devices, but rather encompasses any network-enabled device using any network connection technique to connect to a user area.

The multimedia messaging system 302 includes applications for connecting with and communicating with the multiple different wireless network carriers 204, 206, 208 that have been partnered with platform 202. The MMS 302 is configured to generate message requests in the appropriate format for each of the wireless network carriers 204, 206, 208 including tariff information that determines the amount for which the recipient of the message will be charged. Upon receipt of the message request, the wireless network carriers 204, 206, 208 will use the information in the request to generate an appropriate message to the intended recipient/subscriber of the wireless network carrier and then bill the recipient/subscriber's wireless network service account for the specified amount.

The MMS 302 communicates with the user area 304, such that users of the platform 202 can advantageously use the pre-existing connectivity of the MMS 302 with the wireless network carriers in order to send messages to subscribers of any of the wireless network carriers 204, 206, 208. The messages may be SMS messages, MMS messages, or other message formats that are subsequently developed. Some of these messages may have zero tariff and, therefore do not generate a bill (other than the underlying charges implemented by the wireless network carrier) and others may have non-zero tariffs resulting in a billing event for the recipient user.

The developer's interface 306 provides a link between application developers/providers 308, 310 and the platform 202. In particular, using an interface 312 (described in more detail herein), an application provider 308, 310 may offer services and products to users 212, 214, 216. Advantageously for the application provider 308, 310, the developer's interface 306 also provides automatic and instant connectivity to the wireless network carriers 204, 206, 208 via MMS 302. Accordingly, the application provider 308, 310 can interact with all users of the platform 202 through which billable transactions with users 212, 214, 216 are automatically billed via the billing systems of the wireless network carriers 204, 206, 208, on behalf of the application provider. Furthermore, and importantly, this capability is available to the application provider 308, 310 without requiring the application provider 308, 310 to negotiate or contract with any wireless network carrier for billing arrangements, or to worry about how to communicate with a wireless network carrier's systems and resources. The application provider seamlessly takes advantage of the unified set of connectivity and billing arrangements that exist between the platform 202 and the wireless network carriers 204, 206, 208. Thus, in addition to the contractual arrangements and affiliations the platform 202 has in place with different wireless network carriers 204, 206, 208, the underlying technical and communications infrastructure is also in place to communicate with and interoperate with each of the different wireless network carriers 204, 206, 208. As a result, application providers (vendors) and other users of the platform may interface with and operate with any of the users of a variety of different wireless network carriers without difficulty.

While developer's interface 306 has been described as running on a computer-based platform, the scope of the systems and methods described herein are not limited to such an arrangement. Rather, as will be apparent to one of skill in the art, the systems and methods described herein have application to anyone of a number of arrangements in which a developer's interface provides a link between application developers and the platform 202.

While the terms "application provider" and "user" have been used to distinguish those who provide content from those who enjoy it, it will be easily understood by one of skill in the art that a single person may be both a user and an application provider. Indeed, as the systems and methods described herein render the registration of an application so simple, many users of platform 202 will be motivated to become application developers as well, further increasing the amount and variety of content available via platform 202.

While some applications that are available to users 212, 214, 216 may be hosted in the user area 304, the developer's interface 306, or elsewhere in the platform 202, it is often the case that the application developer/provider 308, 310 will host their own application at their own remote location. Accordingly, in the description that follows, even if a remotely-hosted application is being discussed in a specific example, one of ordinary skill will readily appreciate that an application being hosted differently is also expressly contemplated.

Figure 4:
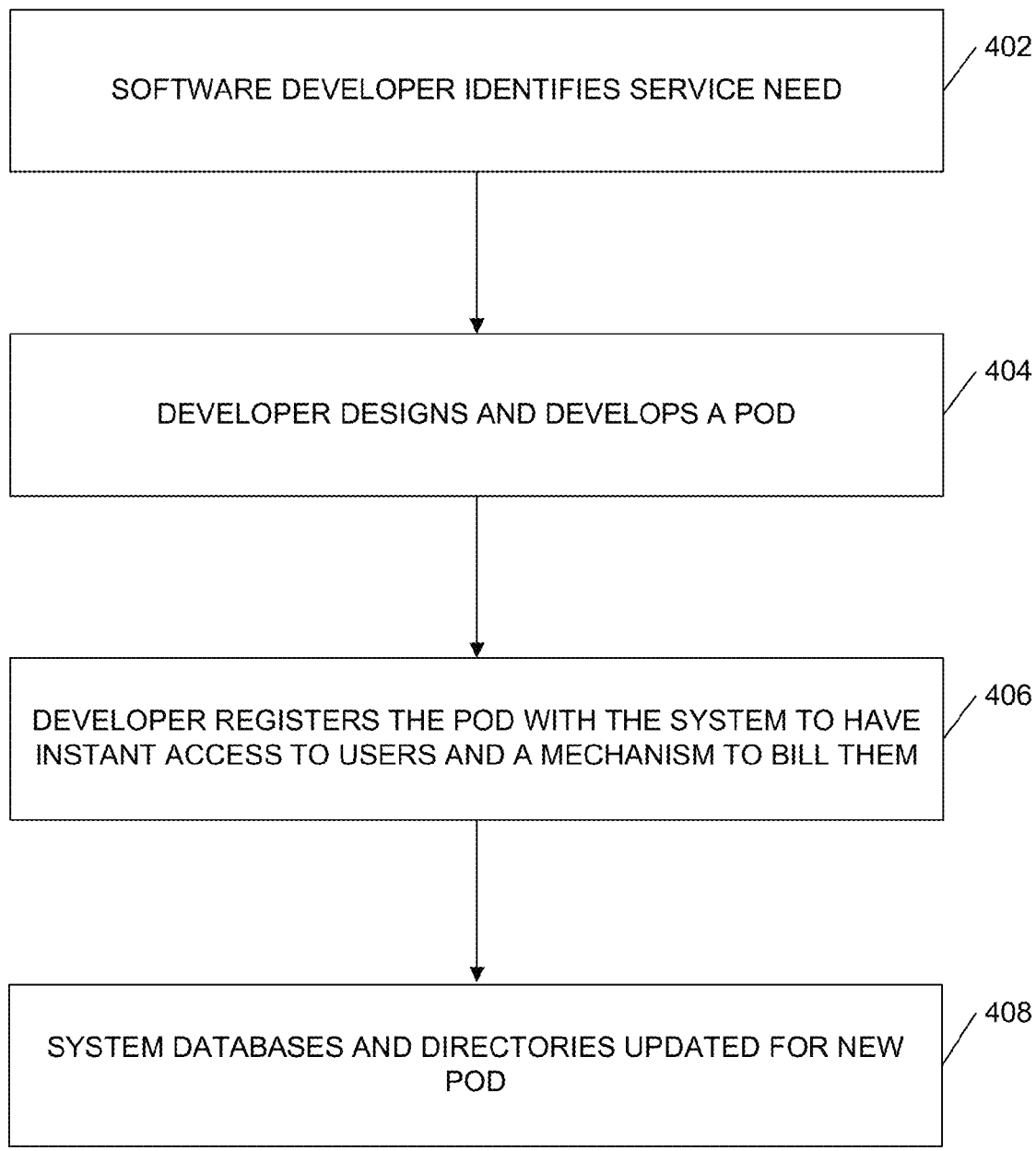
FIG. 4 is a flowchart for explaining the integration of a network-enabled application, according to one embodiment.

FIG. 4 depicts a flowchart of an exemplary method for integrating applications with the platform architecture of FIG. 2. In a first step 402, an application developer identifies a marketplace need that is not being fulfilled. In other words, the application developer believes that there is a service or product that they can provide to networked users that will be profitable to the developer. The variety of different types of services, content and products that can be offered to users via an application is limited only by the imagination of the different application developers.

The term "pod service" or "application" is used in the following description as a label for an application offered through platform 202, which provides a service or product. This label is used merely for convenience and is not intend to limit or restrict the types, variety and capabilities of potential applications in any way. As used herein, the term "pod" refers both to the underlying information related to the application and to the graphical rendering of the application on a user's profile page within the platform 202.

Once the marketplace is identified, the developer commences development of their application in step 404. The underlying application logic is up to the developer and can utilize any of the widely known programming environments and techniques available to one of ordinary skill in this area. However, the application will be offered within the platform 202 along with a variety of other applications. Accordingly, standardizing the look and feel of the application and information about the application will aid the users 212, 214, 216 and make their user experience more enjoyable.

Once an application has been developed (and most likely tested and verified) by a developer, the developer registers, in step 406, the application with the platform 202 through developer's interface 306. Registering the application, which is described in more detail later with reference to a number of screenshots, allows the application developer to inform the developer's interface 306 that a new application is available for integration with and subsequent access through platform 202.

Once an application is registered, the developer's interface 306 updates, in step 408, system databases and directories (provided in storage 311) for the new application and its associated information. In the above description of FIG. 4, it is evident that the application developer communicates with the platform 202 for a number of different reasons. One of ordinary skill will recognize that these various communications between the application developer and the platform 202 can occur via any of a variety of functionally equivalent means. For example, both wired and wireless communication methods for these communications are explicitly contemplated within the scope of the systems and methods described herein.

Figure 5:
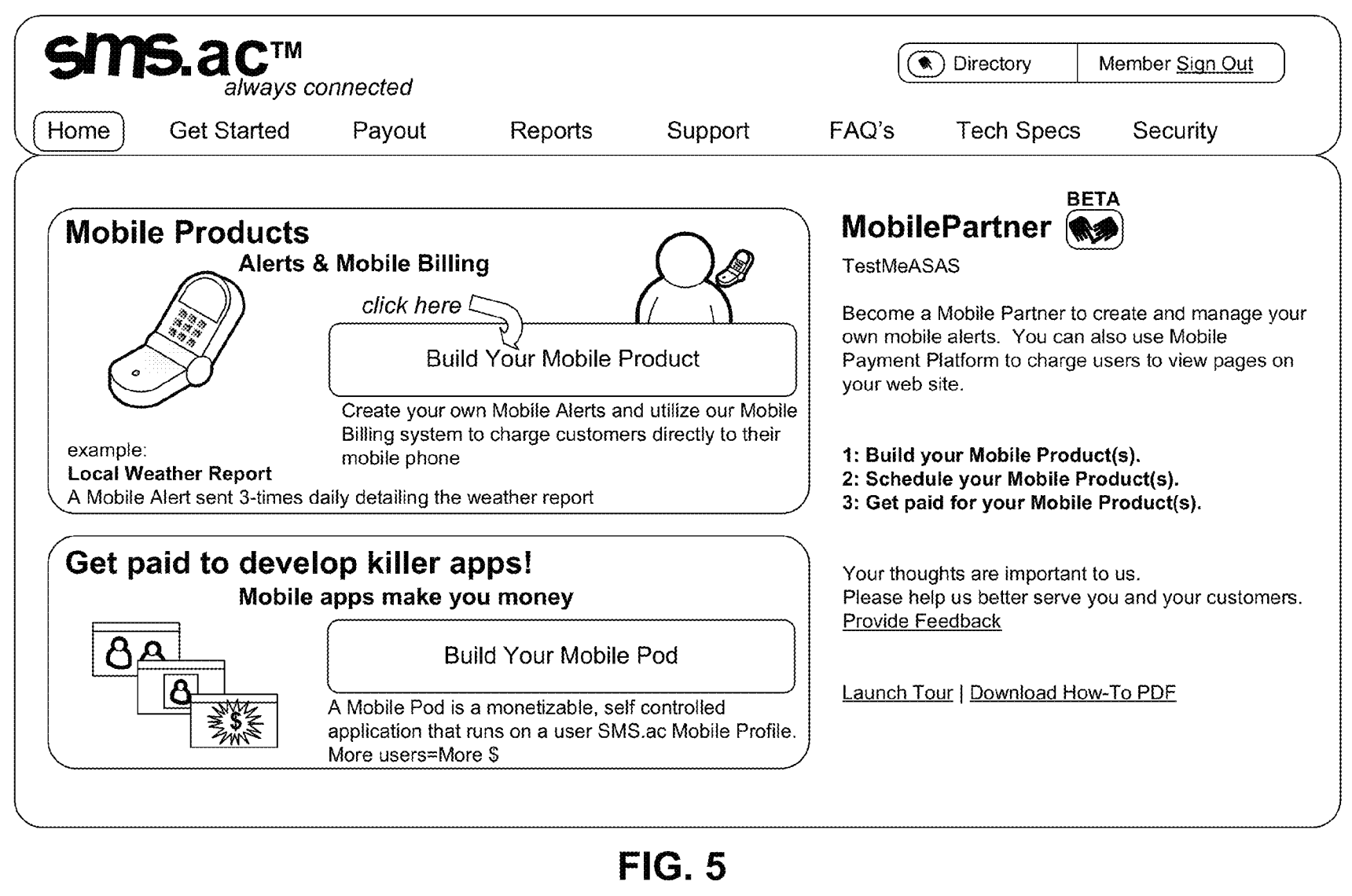
Figure 6:
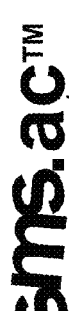
FIG. 6 is a block diagram depicting a webpage for explaining the integration of a network-enabled application, according to one embodiment.

FIG. 5 is a screenshot of an exemplary screen 500 that application developers may be presented with via the Internet by platform 202 to assist in registering a new application. From this screen 500, the application developer can navigate to a screen that provides more technical information such as the one shown in FIG. 6. This screen 600 of FIG. 6 illustrates to the developer how the application takes advantage of the existing payment mechanism of platform 202 when used by an end user.

Figure 7:
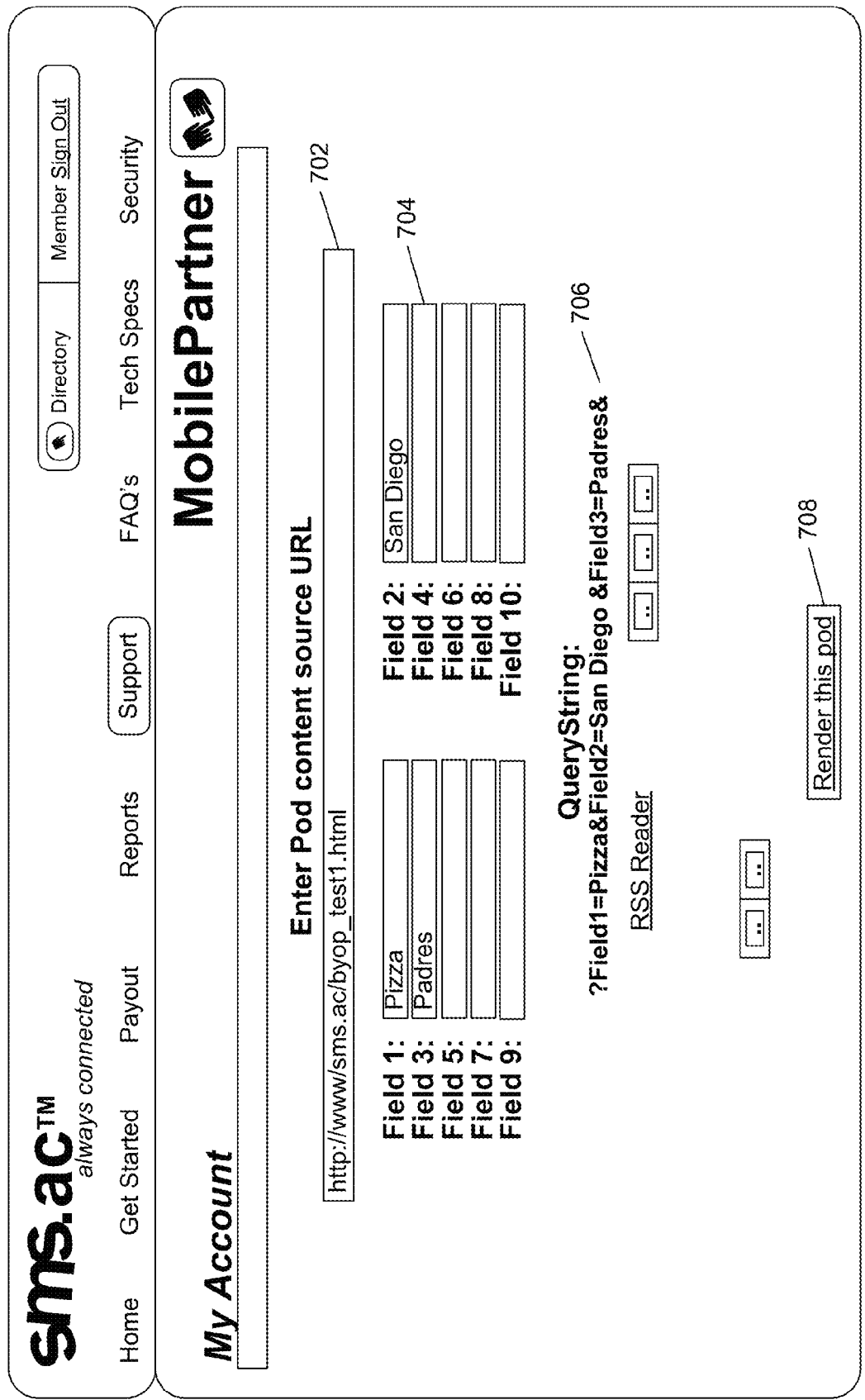
FIG. 7 is a block diagram depicting a webpage for entering information related to a network-enabled application, according to one embodiment.

FIG. 7 is a screenshot of an exemplary application registration screen 700 according to one embodiment of the systems and methods described herein. Because the application is most likely hosted remotely, an input window 702 allows the application developer to provide the URL of where the application is located. When a user ultimately accesses and uses the pod through the platform 202, this URL is the location from where the content for the application is retrieved. For example, if the application was developed to display pictures for a dating service, this URL would point to code that when executed could detect user input events and result in the display of appropriate images.

The pod developer can utilize the field input boxes 704 to specify different fields that can capture input when a user first accesses a pod. For example, if an application is developed to provide stock quotes, then these fields could be defined to accept stock symbols. When the user views the pod within their profile page, these fields can be filled in with appropriate stock symbols, for example. Then, when the user then selects a "submit" button on the pod, this information is sent to the application developer's computing device which returns the appropriate information.

As is well known to HTML and HTTP developers, based on the information that is filled in the field windows 704, a particular query string will be appended to a request received from a user's from submission. To aid a developer in registering a pod, this query string is automatically generated and displayed for the pod developer in region 706 of the exemplary screen. To give the pod developer a quick view of how the pod will be rendered, a button 708 is provided to illustrate the pod. With this information, the developer may choose to revise their design.

Once this initial information is collected, the developer's interface 306 collects additional information that is associated with the pod. FIGS. 8A and 8B depict the first half screen 800 and the second half screen 801 of a registration webpage for inputting registration, in which a number of input fields 802-830 are provided for the pod developer to fill in while registering their application. Many of these fields are self-explanatory; however, some warrant a more detailed discussion. In particular, a pricing window 816 is available for the developer to select an appropriate pricing scheme, according to a standardized pricing structure. According to one embodiment, pricing occurs in fixed tariff bands. For example, one band would be a $0.25 band and would be used for products or services that the developer thinks users would purchase for around $0.25. Another band may be $1.00 and would be for higher priced items and still other bands can be used as well. According to this arrangement, not all prices are available to the developer; instead, the developer picks the closest band to use (e.g., the $1.00 band is selected even if market research shows users would actually pay $1.03 for the service).

Additionally, the application will likely be used by people in different countries. Because of the vagaries of global economics, $0.25 may be too high of a price-point in many countries. Thus, it is more appropriate to set a price-point for each separate country from which the application may be used. While it is possible for the developer's interface 306 to permit the pod developer to set such a vast number of price-points, most developers will not have the knowledge or the patience to perform such a task. Accordingly, the developer's interface 306 automatically provides a price band selection for each country based on their respective costs of living. In other words, a developer can select a price band in the currency that he is comfortable with and let the developer's interface 306 translate that to an equivalent price band in each country.

Via the input field 818, the developer also specifies the number of messages and frequency that their application will send to each user. Based on their knowledge of having developed the application to perform a particular service, the pod developer may, for example, know that no more than 4 messages per day (per user) will be sent from their application. This information sets the terms and conditions for billing the user. Thus, they would fill in this field 818 accordingly. As explained later, the developer's interface 306 can use this information to control message traffic within the platform 202.

Figure 8C:
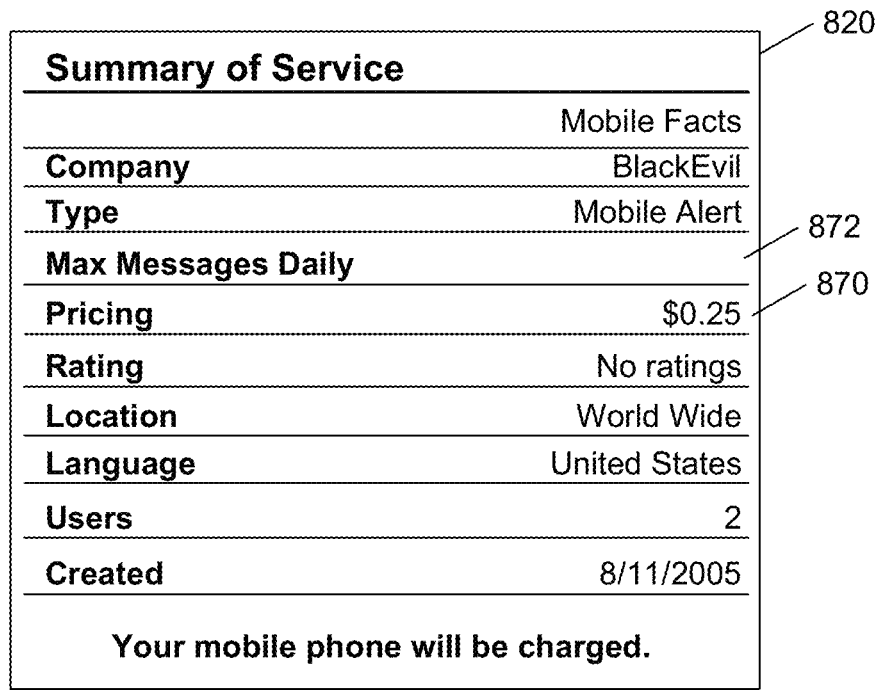
FIG. 8C is a block diagram depicting a summary display of information and pricing related to a network-enabled application, according to one embodiment.

The benefit of specifying the pricing information and number of message information is that the terms and conditions of the application can be provided to a user in a uniform manner. Window 820 displays, for the pod developer, how the application information, including pricing, terms and conditions, will be shown to a user. FIG. 8C depicts a more detailed view of this uniform pricing display 820. Much, like nutritional labels on food products provide a uniform format for presenting the nutritional information, the format depicted in window 820 can be used to uniformly present information about applications. Thus, a user of the platform does not have to learn and interpret different pricing information for each different pod developer. Instead, the uniform format 820 simplifies understanding this information. The exemplary format of window 820 includes a variety of information about the application. Of particular interest to most users is the uniform manner in which the pricing information 870 and the message information 872 is clearly presented. One of ordinary skill will appreciate that the format of window 820 is merely exemplary in nature and can vary in numerous ways without departing from the scope of the systems and methods described herein. Accordingly, the exemplary format of window 820 is provided to illustrate that the developer's interface 306 is arranged so as to provide users of the platform 202 with uniformly formatted information from a variety of different applications so as to simplify the evaluation and comparison of different offerings. With such a uniform pricing arrangement being utilized, it becomes possible to monitor the behavior of pod developers with respect to their specified pricing structure and implement control measures such as limiting or restricting their activities with users of the platform if warranted.

Once the information of screens 8A and 8B are submitted to the developer's interface 306, the application is registered with the platform 202. According to at least one embodiment, the application is evaluated by a moderator of the platform 202 to ensure it is acceptable from a technical and content point of view for the platform 202. In this scenario, the application is not registered until the evaluation is completed satisfactorily.

Information about a registered application is stored within the developer's interface 306 in such a way that when a user wants to include a pod on their profile page, the pod can be rendered using the stored information and interaction between the pod and user will occur based on the stored information as well. In such a case, the data associated with the user will be updated to reflect that the user is now accessing and using the pod.

Thus, according to the previously described technique, a pod developer can automatically register a new application (even from a remote location) without difficulty in such a way that the pod automatically becomes available to users of the platform 202 at the conclusion of the registration process. Furthermore, from the pod developer's point of view, the application may immediately take advantage of the access to all users of platform 202 and to the billing platform used by the platform 202 without the need to have existing contracts in place with any of the wireless network carriers.

Once registered, the application is made accessible to the users of platform 202 via a networked interface operated by the platform. For example, according to one aspect, the network-enabled application is integrated with platform 202 via the application interface platform. According to another aspect, a message communication channel is established between the network-enabled application and the message management system. According to yet another aspect, the networked interface is an application webpage that is operated by platform 202 and that includes an application identifier corresponding to the network-enabled application. According to yet another aspect, the networked interface is an application webpage that can be downloaded to a user's mobile device, such as a mobile phone, personal device assistant (pda), smartphone, handheld gaming device, Blackberry®, ultra-mobile PC (UMPC), or anyone of a number of other mobile devices known to those of skill in the art.

One benefit of registering applications in this manner is that once registered, the developer's interface 306 can prevent the terms and condition information from being subsequently changed by the pod developer. Thus, a user's agreed upon price and operating parameters when initially subscribing to the application will not later be modified (with or without their knowledge).

The users of the platform can locate available applications in a number of different ways. First, the platform 202 facilitates sharing of information by users having common tastes. Accordingly, users frequently visit other users' profile pages looking for interesting applications, content and information, particularly with neighborhoods to which the user belongs. During this visiting of other members' home pages, a user can discover an interesting pod and want to access it for themselves. In terms of the platform, a user "owns" their own profile page and is called an "owner" when at their profile page. In contrast, when a user visits some else's profile page, they are considered a "viewer". Within the platform 202, the profile pages are maintained such that the view by an owner may not always correspond to that seen by a viewer as the owner may want some information to be private and other information to be public.

In another instance, a user may know a friend or colleague would want a particular application; thus, the platform 202 allows a user to inform another user about the existence of a new application. Another way in which applications are located is via a directory within the platform 202. For example, the developer's interface 306 registers each application as the developers submit them; it is a simple extension to include a database update and a searchable-directory update as part of the registration process (see step 408 of FIG. 4).

While the exemplary embodiment discussed above has described the registration of an application using an Internet-based webpage, the scope of the systems and methods described herein are not limited to this particular arrangement. Rather, as will be apparent to one of skill in the art, an application may be registered by a developer by providing the requisite information in anyone of a number of functionally-equivalent manners. For example, and without limitation, a developer may register a new application by sending an appropriately formatted text-message or email to a server configured to parse the information therein.

For purposes of this specification, the term "application" should be understood to encompass not only executable program code, but rather includes any data by which content is provided to a user. For example, according to one embodiment, an application registered by an application provider or uploaded by a user may be as simple as a multimedia file or content stream for providing music and/or video to a user's mobile device or computer. Alternately, an application may be a plaintext or markup language file or content stream such as an HTML-formatted web log ("blog") or an aggregated news feed (e.g., RSS or ATOM). As will be apparent, systems and methods described herein have application to anyone of a nearly limitless number of content types which may be provided over a network.

Figure 9:
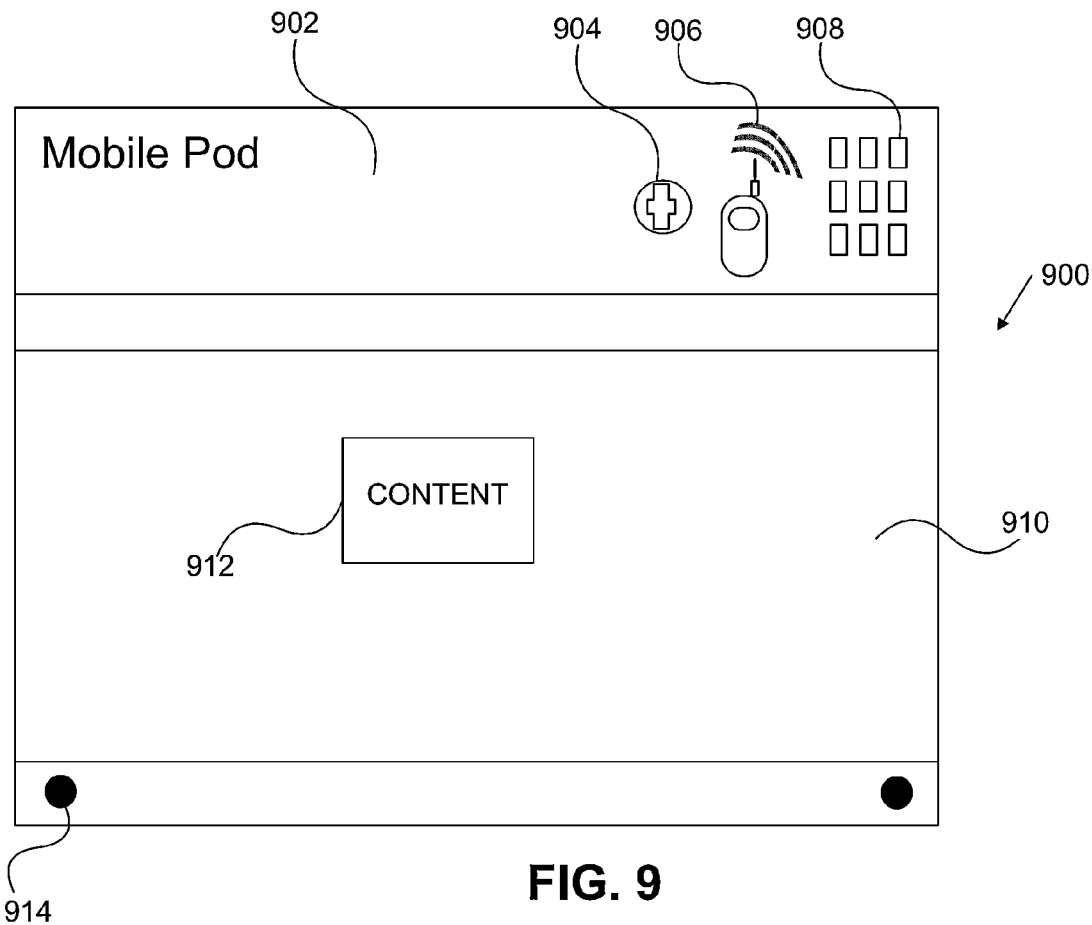
FIG. 9 is a block diagram depicting an application, according to one embodiment.

A rendering of an exemplary pod 900 is depicted in FIG. 9. The pod includes a title bar 902 with a number of icons 904-908. The main window 910 of the pod is where the content 912 is displayed. This content is based on the associated application and the stored system information associated with this pod. From the pod 900, a user launches an initial message to the associated application. In instances where the application provides content back to the pod 900, the window 910 is updated. By using remote scripting capability, as is known in the art, the updating of window 910 can occur without the user manually refreshing the window 910. Similar to the profile pages described earlier, the pod 900 can be designed to provide different views of content 912 to a user depending on whether the user is an "owner" or a "viewer".

The icon 904 can be selected by a user (for example, when viewing someone else's pod) to add that pod to their own profile page. The icon 906 can be selected to inform another user about this pod and a drag icon 908 can be used to move the pod around a user interface screen. The "information" icon 914 is useful for displaying information about the pod, including the uniform pricing information described earlier.

Figure 10:
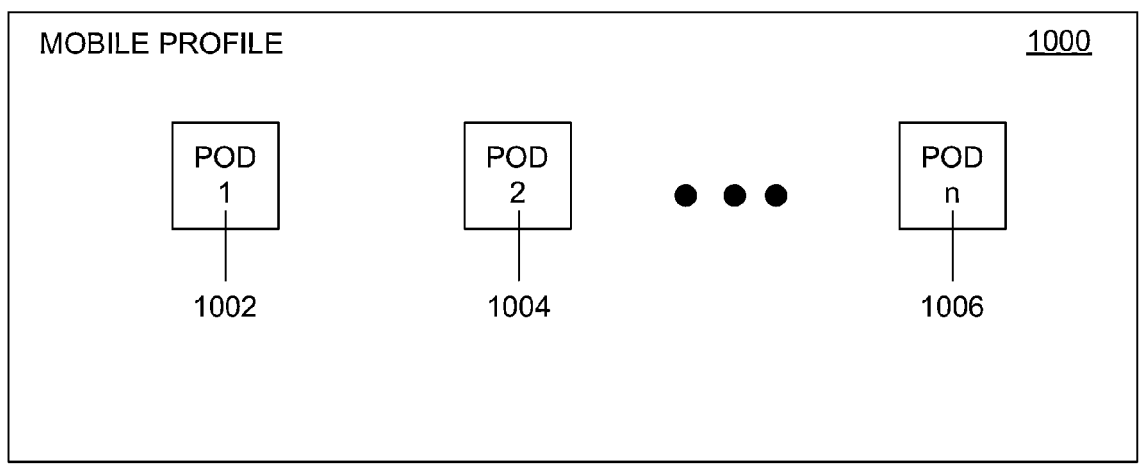
FIG. 10 is a block diagram depicting a profile webpage, according to one embodiment.

FIG. 10 depicts a exemplary user profile page 1000 that has arranged thereon a plurality of applications 1002, 1004, 1006. In this manner, the pods available to a user can be displayed on their profile page. As noted earlier, the user can access this profile page via a number of different devices and/or networks. For example, in addition to use of a traditional web browser, a portable device such as a smart phone or PDA can be used to access the profile page and pods. Such portable devices can utilize traditional WAP-based or HTML-based network connection techniques to access the pods through a network, such as a local intranet or a wide area network such as the internet, but they may also utilize device-based applications with proprietary network protocols specifically developed to advantageously utilize the capabilities provided by pods and applications. For example, according to one embodiment, an ad-hoc wireless network created on-the-fly between the mobile devices of several users may be used to share profile pages and/or pods without relying upon a web-based network. In such an embodiment, one mobile user may be able to access a pod hosted on the mobile device of another user. As will be apparent to one of skill in the art, the scope of the systems and methods described herein are not limited to the particular networks and/or devices described above, but rather includes any network-enabled device and any network connection technique used to connect such a network-enabled device to any type of network.

Figure 11:
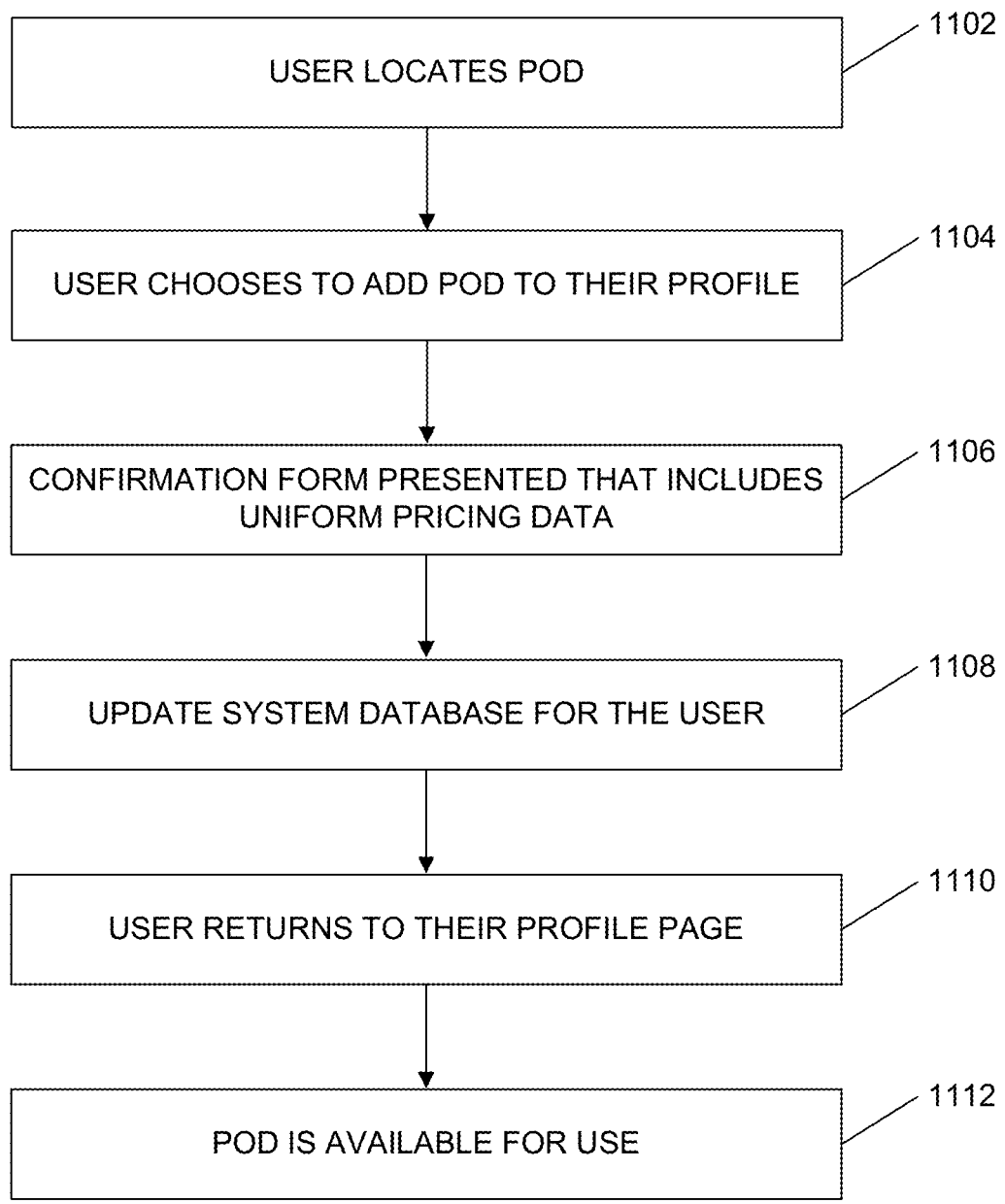
FIG. 11 is a flowchart for explaining the subscription of a user to a network-enabled application, according to one embodiment.

FIG. 11 illustrates a flowchart of an exemplary method for a user to add a pod to their profile page. In step 1102, the pod user locates an interesting pod via a visit to another user's profile page or through a directory search. In evaluating the pod, the user can see the terms and conditions of the pod in the uniform presentation format described earlier. Next, in step 1104, the user chooses to add the pod to their profile page; typically using a standardized feature on the pod. In step 1106, a confirmation page is sent to the user to ensure they know the pricing information about the pod and to ensure they are aware of the likelihood of their wireless network service account being billed as a result of executing the application. Assuming the user confirms their selection, the user area 304 updates, in step 1108, its data store 315 about this user such that the records indicate the user owns this new pod on their profile page. When the user next visits their profile page, in step 1110, and as a result of the user area 304 rendering their profile page on their browser, the new pod will be displayed. With the pod displayed within the profile page, it is now available for use by the user, in step 1112.

Figure 12:
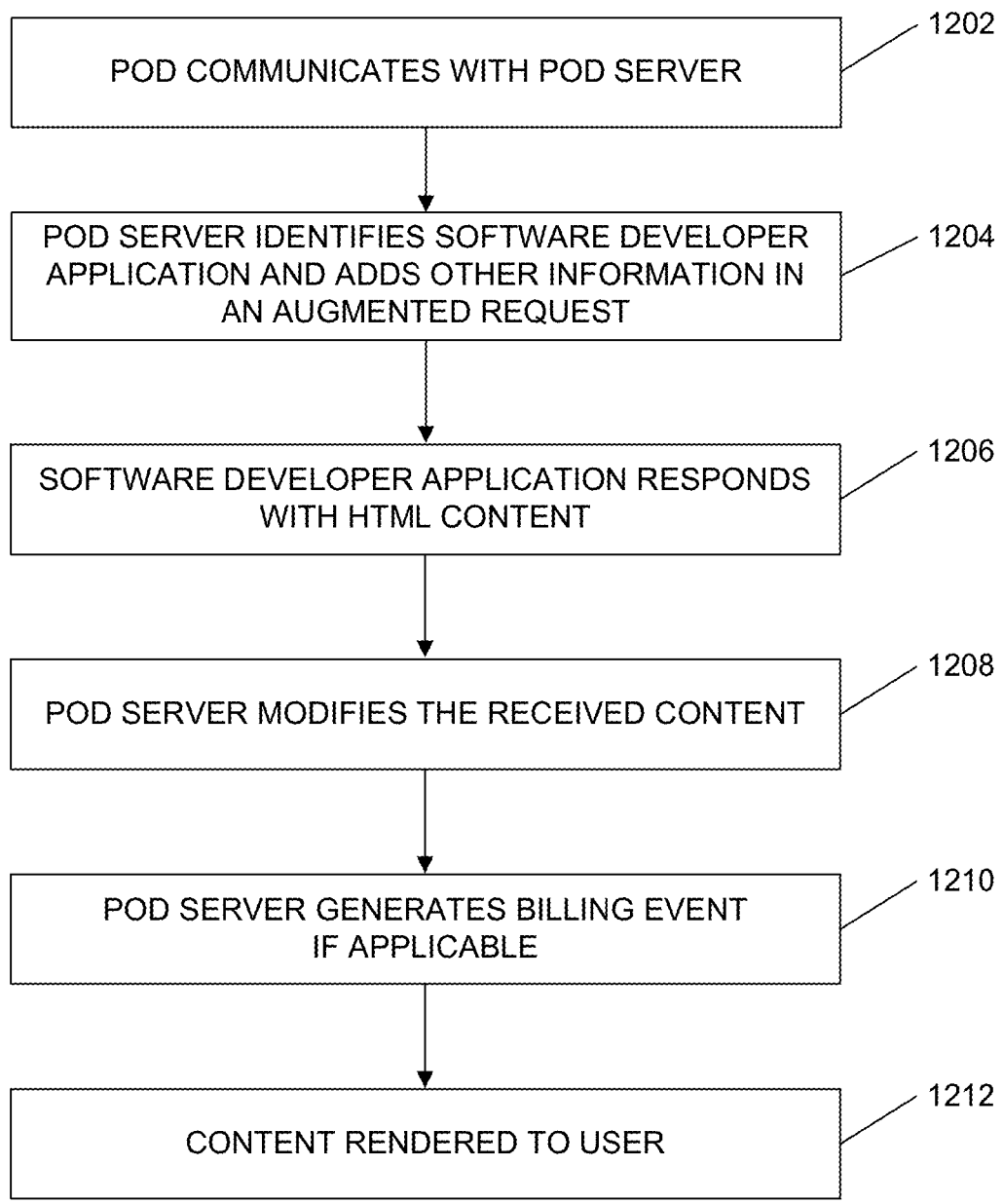
FIG. 12 is a flowchart for explaining the operation of a network-enabled application, according to one embodiment.
Figure 13:
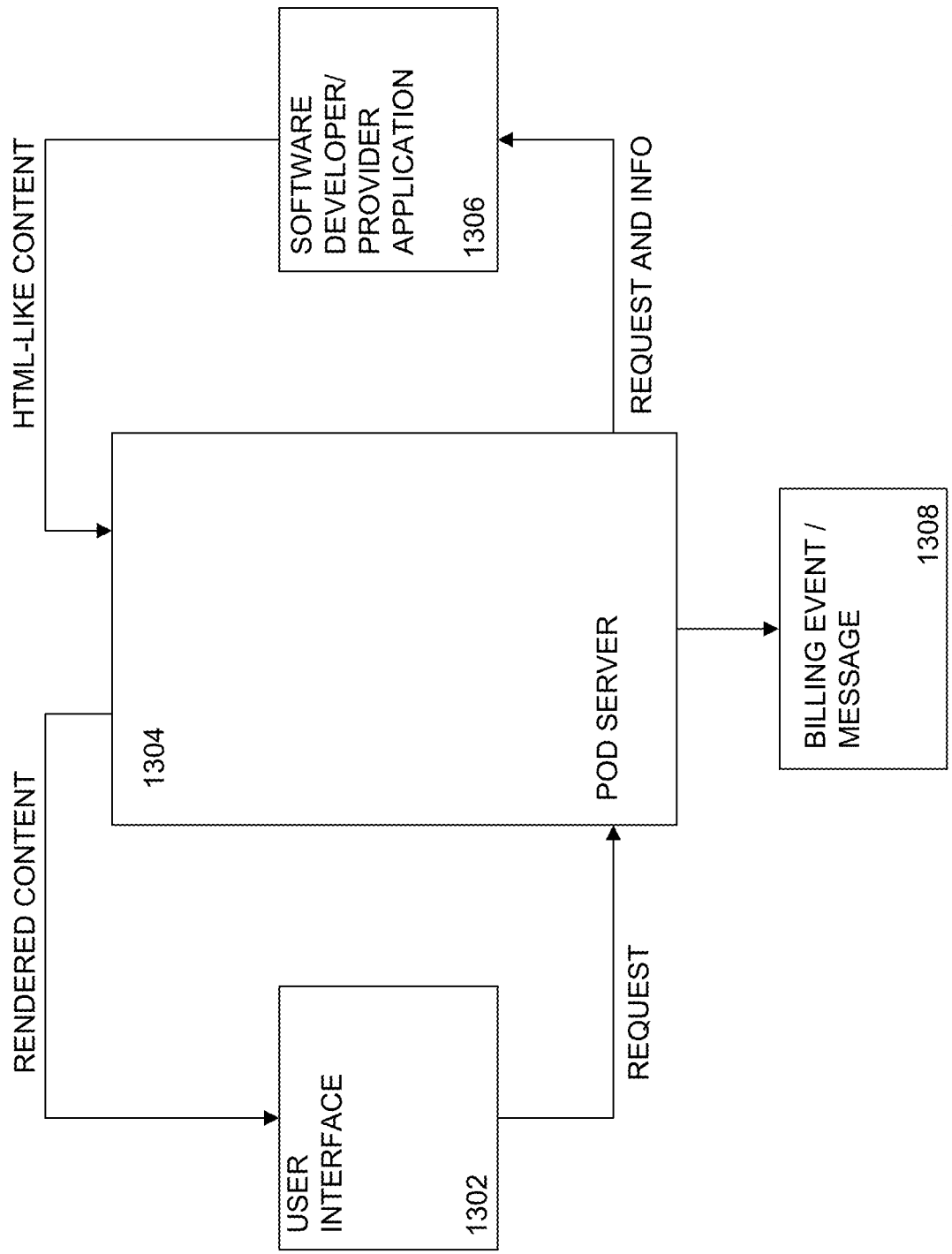
FIG. 13 is a block diagram for explaining the operation of a network-enabled application, according to one embodiment.

FIGS. 12 and 13 illustrate the operation of a pod and its associated application server with respect to platform 202. As known to one of ordinary skill, the pod server 1304 may be a process executing on a separate, dedicated processor or may be included as part of the user area 304 or the developer's interface 306. In step 1202, a user interacts with some feature on the pod user interface 1302 to generate a request. This request, includes the URL associated with the content of the pod and a query string (if any) based on the fields of the pod, and information input by the user. The query string can be referred to as transient parameters.

In response to the request from the pod user interface, 1302, the pod server 1304 identifies the pod developer server and the URL of the content and adds some additional information, in step 1204. The augmented request is sent to the application provider's application server 1306 which responds, in step 1204, to the augmented request.

In the previously mentioned incorporated document, exemplary types of augmented information are described in detail. In general terms, the information added to the augmented request includes demographic information about the owner and viewer of the pod. In this way, the application server 1306 can respond with a first type of content if the owner and viewer are the same or respond with different content if the owner and viewer are different. One way to accomplish this distinction is for the user area 304 to refer to users by a unique user ID number. Thus, users can be distinguished without revealing sensitive information to a application developer such as the mobile telephone number of a user.

Also, the application server 1306 can use this demographic information to collect statistics about its users.

Other additional information that might be added would include details about the type of user interface the user has available. Because users may be using their mobile device, their display may not be as robust as a desktop interface. Thus, application server 1306 can control content based on the current graphical and bandwidth capabilities of the user. For example, the additional information can indicate whether the user is operating in a web-based or WAP-based environment.

In response to the augmented request, the application server 1306 responds with code, in step 1206, that is substantially HTML data. This code is generated according to the application logic of the application server 1306. In other words, it is the content that is returned to the user who is viewing the pod. In certain embodiments, the code of the response varies from conventional HTML in certain ways. For example, because this is a managed communication system, non-standard HTML tags can be used and supported. Thus, non-standard tags can be used that are specific to the pod environment that are not applicable to generic HTML pages. For example, a pod has a title area and a message area. Tags specifically for controlling these areas may be used to add functionality to the pod environment described herein. One of ordinary skill will recognize that a number of different specialized tags and capabilities can be offered without departing from the scope of the systems and methods described herein.

An additional variation from HTML is that of using templates where information can be provided by the pod server 1304. For example, for privacy concerns, little identifying information is sent to the application server 1306. However, the pod server 1304 has access to this information because it communicates with the user information stored in the user area 304. Thus, the use of templates will allow application server 1306 to take advantage of this information to personalize the pod experience. For example, the template may include a tag <! FirstName !>. When the pod server 1304 encounters this tag in the template, it knows that the application server 1306 intends for the pod server to insert the first name of the user. A more detailed list of exemplary template tags is provided in the previously mentioned incorporated document.

When the pod server 1304 receives the HTML-like reply from the application server 1306, the pod server manipulates the reply into a format useful for the pod environment. For example, certain HTML features such as, for example, javascript, iframe, frame, and script features, are removed from the reply in order to improve the security of the content. Secondly, the pod server 1304 can replace the personalizable parameters in the templates with the actual user information. And thirdly, the pod server 1304 can translate the content into other display formats, depending on the operating environment of the user (mobile or computer).

For example, if an application provider is well-skilled in providing WAP code as opposed to conventional HTML code, then that provider can control which code, or content, is generated based on the information it knows about the user's interface. However, if an application provider is not skilled with, or does not support, generating content in different formats, then the application can request (as part of the code it sends back to the pod server 1304) that the pod server 1304 translate the code into a more appropriate format.

Another modification the pod server 1304 can make is that of manipulating the hyperlinks within the code sent by the application provider. Under normal behavior, such a hyperlink would result in opening another browser window and following the link. As is known to one skilled in this area, the original hyperlinks are adjusted by the pod server 1304 so that pages rendered by following the links remain under the control of the pod server 1304 and the user interface remains within the focus of the pod instead of some other browser window.

Once the pod server 1304 completes its changes to the original code in step 1208, the pod server 1304 renders the code and content to the user's pod 1302, in step 1212.

In addition to the code that is received from the developer's application server 1306, the pod server 1304 can also receive information from the application server 1306 about a billing event that should be triggered for the particular content that the user requested. For example, the user may have requested a stock quote that will cost $1.00. When application server 1306 generates the content of the reply (e.g., when application server 1306 transmits the data corresponding to the stock quote to the mobile device of the user), it also generates a message that the pod user should be charged $1.00 for this transaction. One of ordinary skill will appreciate that there is wide variety of protocols for the pod server 1304 and the application server 1306 to exchange information related to a billable transaction. During operation, therefore, the developer's application server 1306 merely adheres to the agreed upon protocols to inform the pod server 1304 that a billable transaction has occurred.

When the pod server 1304 determines that the code from the application server 1306 includes an indication that billing should occur, the pod server 1304 generates a billing event 1308, in step 1210. This billing event 1308 is forwarded to the developer's interface 306 so that billing may occur by using the wireless network carrier's underlying billing systems. In alternative embodiments, the billing event can be handled by developer's interface 306 to achieve payment through anyone of a variety of billing mechanisms, such as prepaid card services, web-based payment services, bank account and credit card billing services, and other such external billing mechanisms that support customer transactions. The pod server 1304 has access to the recipient information (i.e., the pod user) and the billing rate of the application supported by application server 1306. Therefore, an appropriately formatted billing message is easily generated.

The developer's interface 306 includes a message interface 1402 to handle billing events from a variety of sources. Although a different interface could be designed for each different source of billing events, it is more efficient to use a single application programming interface (API). The use of a single API is exemplary in nature and is not intended to restrict or limit the different ways that the developer's interface 306 can exchange messages.

Figure 14:
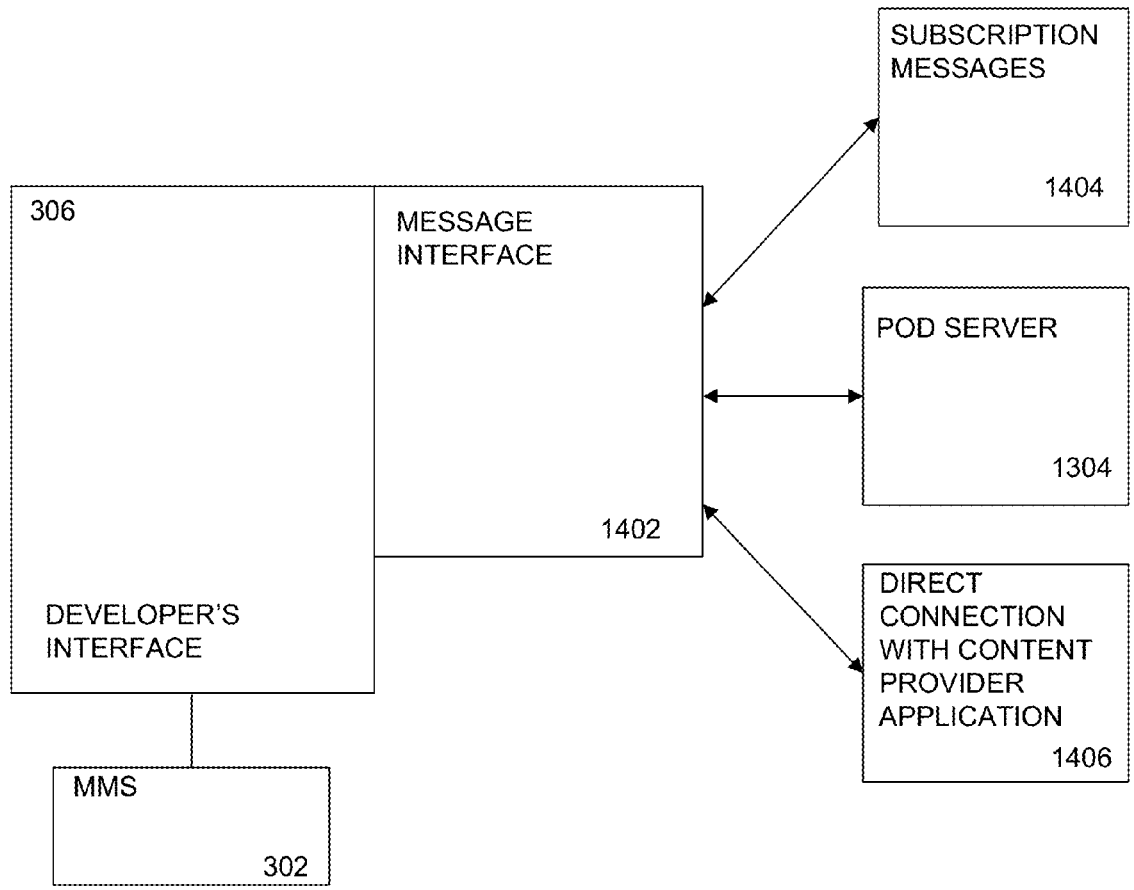
FIG. 14 is a block diagram for explaining the operation of a network-enabled application, according to another embodiment.

One type of billing message originates from subscription-based services. Under these circumstances, a database or other storage system maintains a record of when to send a message to a user on a predetermined periodic basis (e.g., daily, monthly, weekly, etc.). When the management system for these subscription services indicate that a message is to be sent, then this message is forwarded to the interface 1402 (FIG. 14) of the developer's interface 306 with the appropriate tariff information included.

As discussed earlier, the pod server 1304 can also generate a message based on a discrete billable event occurring due to the user's operation of an application. In this instance the billing message 1308 is forwarded to the interface 1402.

In another circumstance, the application may operate so as to avoid sending content back through the pod server 1304 but still be designed to perform a billable event. For example, the application may be a virtual greeting card application that sends text messages to people based on whether it is their birthday, anniversary, etc. and charges the pod user $0.25 for each card. Thus, the application server 1306 performs billable activities but not via the content it sends back through the pod server 1304. Under these event-based circumstances, the application provider can establish a direct connection with the interface 1402 and send a billable message via the established interface.

Regardless of how the billable event arrives at the interface 1402, the developer's interface 306 processes it such that a message is sent via the MMS 302 through the wireless network carriers to the user of the pod. This message, the content of which may say, for example, "Thank you for being a valued customer of xxx" will have associated with it a tariff code that results in the user being billed via their wireless network service account.

Thus, a business model is established where platform 202 directs a wireless network carrier to bill a user for a billing event generated by the user's use of an application, and then the revenue from that billing is shared in an agreed-upon portion with platform 202 which, in turn, shares an agreed-upon portion of that billing with the application provider. The wireless network carrier benefits from additional billable data traffic and the application provider benefits by obtaining instant access to all the users of the platform as well as instant access to the wireless network carriers' billing systems in a seamless and unified fashion through the platform. As mentioned above, other versions of the billing model can use other billing mechanisms rather than billing the user through the wireless network carrier of the user, such as prepaid card services, web-based payment services, bank account and credit card billing services, and other such external billing mechanisms to support customer transactions.

The presence of the developer's interface 306 between the application provider's application 1306 and the MMS 302 provides the benefit that the messaging of different users of the platform 202 can be controlled to ensure the platform 202 is more enjoyable.

Within the platform architecture, the various computer-based components discussed thus far have a vast amount of information stored and readily accessible. For example some of the information includes: identifying information about each application, identifying information about each user, identifying information about which pods are associated with each user, information about the terms and conditions regulating the operations of an application, and information about messages being sent via the platform 202. With this information available, one of ordinary skill will recognize that a number of operating parameters of the platform 202 can be monitored and controlled.

Figure 15:
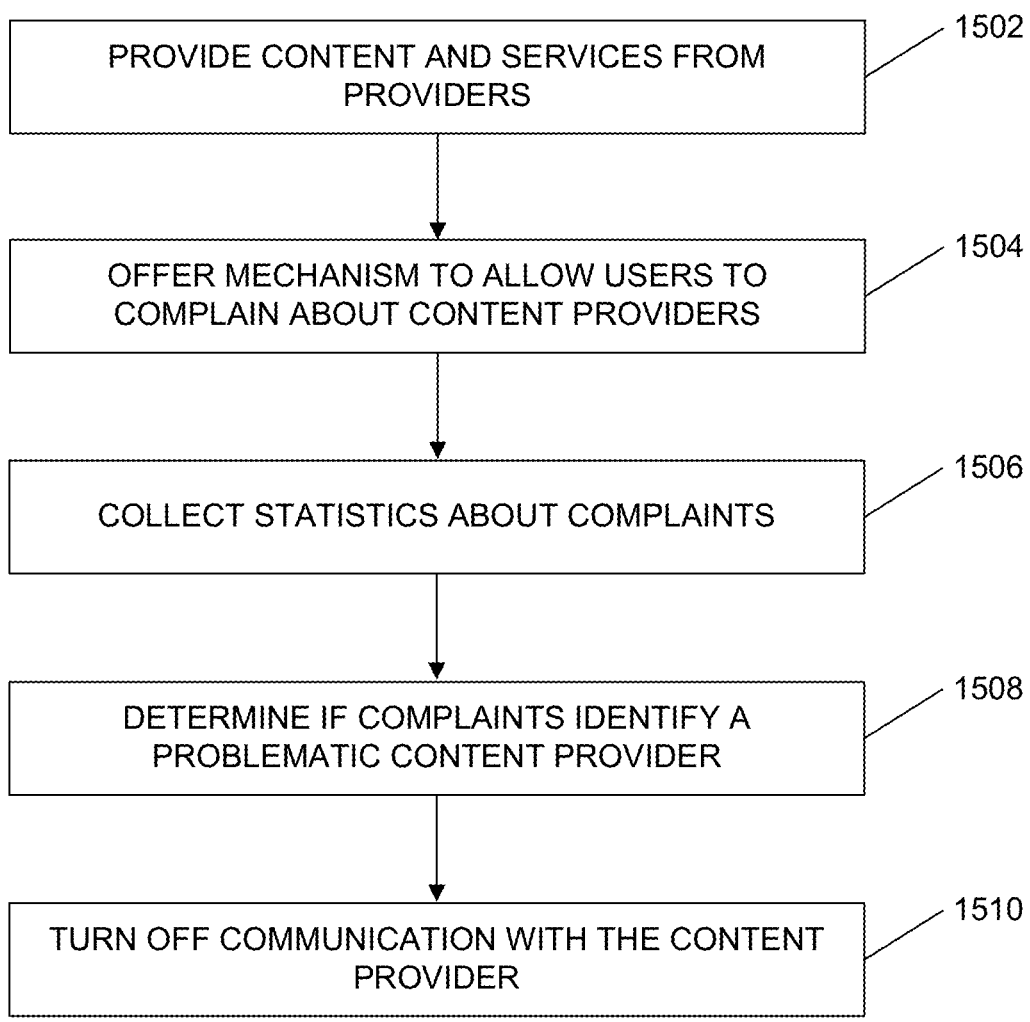
FIG. 15 is a flowchart for explaining the control of a network-enabled application based on user complaints, according to one embodiment.

FIG. 15 depicts a flowchart of an exemplary method for instituting a complaint monitoring program within the platform 202, which can ultimately result in automatic cut-off of access to, and billing activities by, an application. In accordance with this flowchart, while all the parties are using the platform 202, content and services are being provided by different application providers in step 1502. Within the profile page of a user, or alternatively at a more centrally located webpage operated by platform 202, a link may be provided, in step 1504, to submit a complaint. The developer's interface 306 then collects these complaints and generates, in step 1506, statistics about them. For example, one statistic may be to identify what percentage of users of an application are complaining that it fails to operate as promised, provides unsuitable material, improperly bills, or includes some other problem.

In step 1508, the complaint statistics are evaluated to determine if a problem exists. Typically there would be checks and balances used to ensure that a single user is not abusing the system with a flood of complaints or that 100 complaints is not really a problem if the user base is 10 million. If a problem is found to exist with a particular application, which can be determined if the received complaints for that application exceed a predetermined threshold, then in step 1510, the developer's interface turns off communication between that application and platform 202. Thus, the pod server of platform 202 can be informed to ignore any communications to or from that particular application. Because an application provider may supply more than one application, an embodiment is provided in which the system turns off communication with all applications from that provider, not simply the ones relating to only the problematic application.

Figure 16:
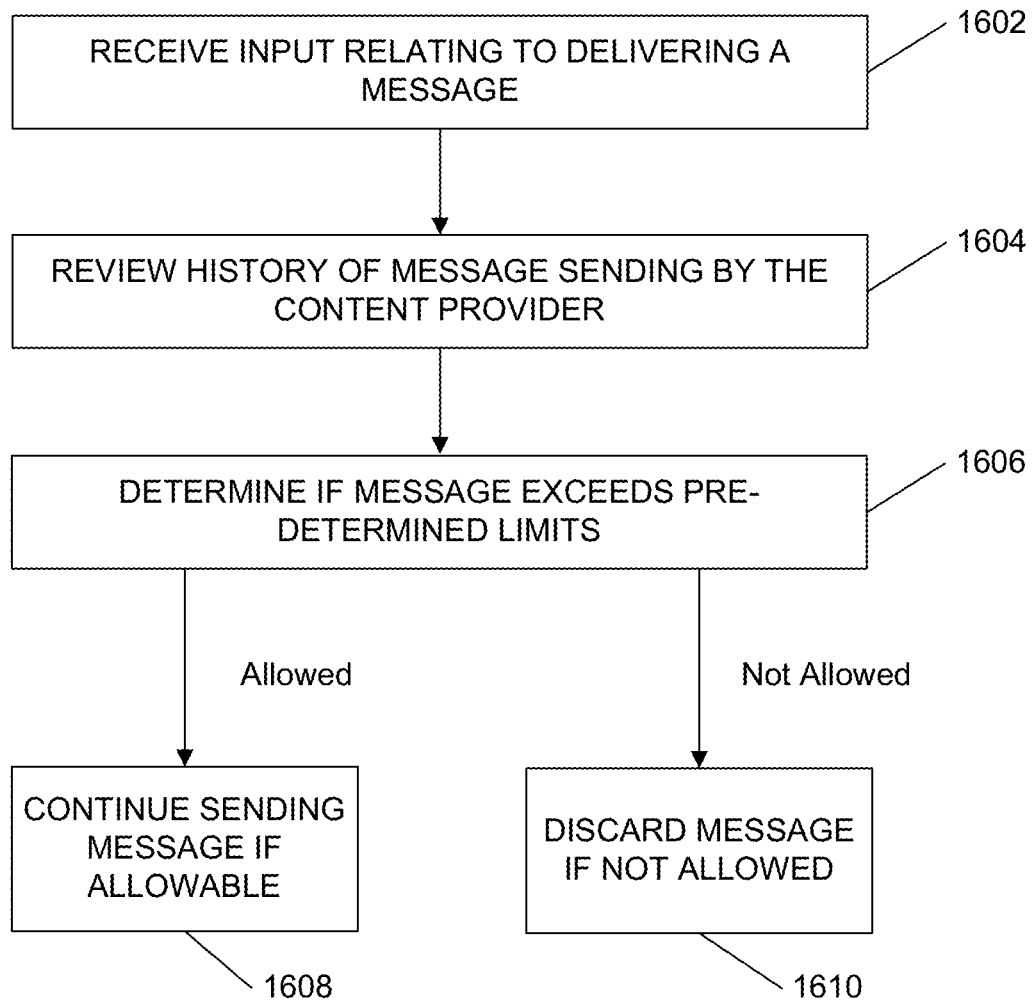
FIG. 16 is a flowchart for explaining the control of a network-enabled application based on a predetermined pricing structure, according to one embodiment.

FIG. 16 provides a flowchart of an exemplary method for regulating messages such that the agreed upon terms and conditions of the operating parameters of the pricing structure for an application are adhered to. At the time a subscriber decides to subscribe to an application, the subscriber is shown details relating to price, message frequency, maximum messages sent to the user in any given time period, and other terms relating to the specific application. Upon agreeing to those terms and conditions, those terms and conditions are memorialized for that specific subscriber within the platform, such that if the application provider later changes the price or other terms of the service, such new terms will only apply to the new subscribers that enter a "contract" after the date of change. The system ensures enforcement of the original terms and conditions that each individual subscriber was shown and agreed to during subscription to the application.

In step 1602, the developer's interface 306 receives via its interface 1402 a message from an application developer's application server to send to a user. As part of the agreed upon interface, the message arrives from an identifiable source and specifies the recipients for the message. A recipient can be a single user or it could be a group such as "San Diego Padre fans" which the system will expand into the individual subscribers when delivering the message.

Thus, in step 1604, the developer's interface analyzes historical information about messages sent by this application sender to the specified recipient. In step 1606, this historical data can be compared to the pre-defined threshold limits for the application message sender. If the message would cause the pre-determined limits to be exceeded for that application, then the message is discarded in step 1610 thereby avoiding billing of the user. If the message is allowable, then the message is sent to the user as normal in step 1608.

In the above description of the various aspects of the systems and methods described herein, the specific example of an application was described in detail. This specific example was provided merely to highlight many of the features and aspects of the systems and methods described herein. But it will be recognize that providers of other types of products and services can also utilize and benefit from the platform system. In particular, certain embodiments can allow application vendors to charge for all types of products and/or services via the platform's pre-existing connectivity to the various wireless network carrier systems. In practice, a user consummates a transaction with a vendor through an application for some product or service and, in the process, provides to the vendor a means of identifying that user within the platform. The vendor, in turn, will communicate with the platform (e.g., via the Mobile Global Platform) to initiate a billing event that identifies the purchaser and the transaction amount. As explained above, this billing event will result in the platform triggering the user's wireless network subscriber account to bill the user accordingly for the transaction amount. In this way, the mobile phone account (although this information is not necessarily revealed to the vendor) acts as a virtual wallet allowing the purchaser to easily pay for a variety of different types of transactions through the use of applications. In other embodiments, as mentioned above, other billing mechanisms can be used by the platform rather than billing the user through the wireless network carrier of the user, such as prepaid card services, web-based payment services, bank account and credit card billing services, and other such external billing mechanisms to support customer transactions.

Some third parties may have content, such as a blog, music, video, text, or other digital content, that they wish to offer to users of the community platform; however, many such third parties may not be knowledgeable or capable of developing an application pod through which their content can be delivered to the community platform. Other third parties with content to offer may simply not want to expend the time and resources necessary to develop such an application pod. Accordingly, it is desirable to have a method and/or system which allows a third party to offer their content for purchase and use by users of the community platform without requiring the third party to design, develop and implement an application pod. Accordingly, in certain embodiments, the third party does not need to have the requisite skills and capabilities, time or resources to develop an application pod through which to offer the third party's content, such as a blog, music, video, text, photos, or other digital content, to mobile phone users within the community network.

Figure 17:
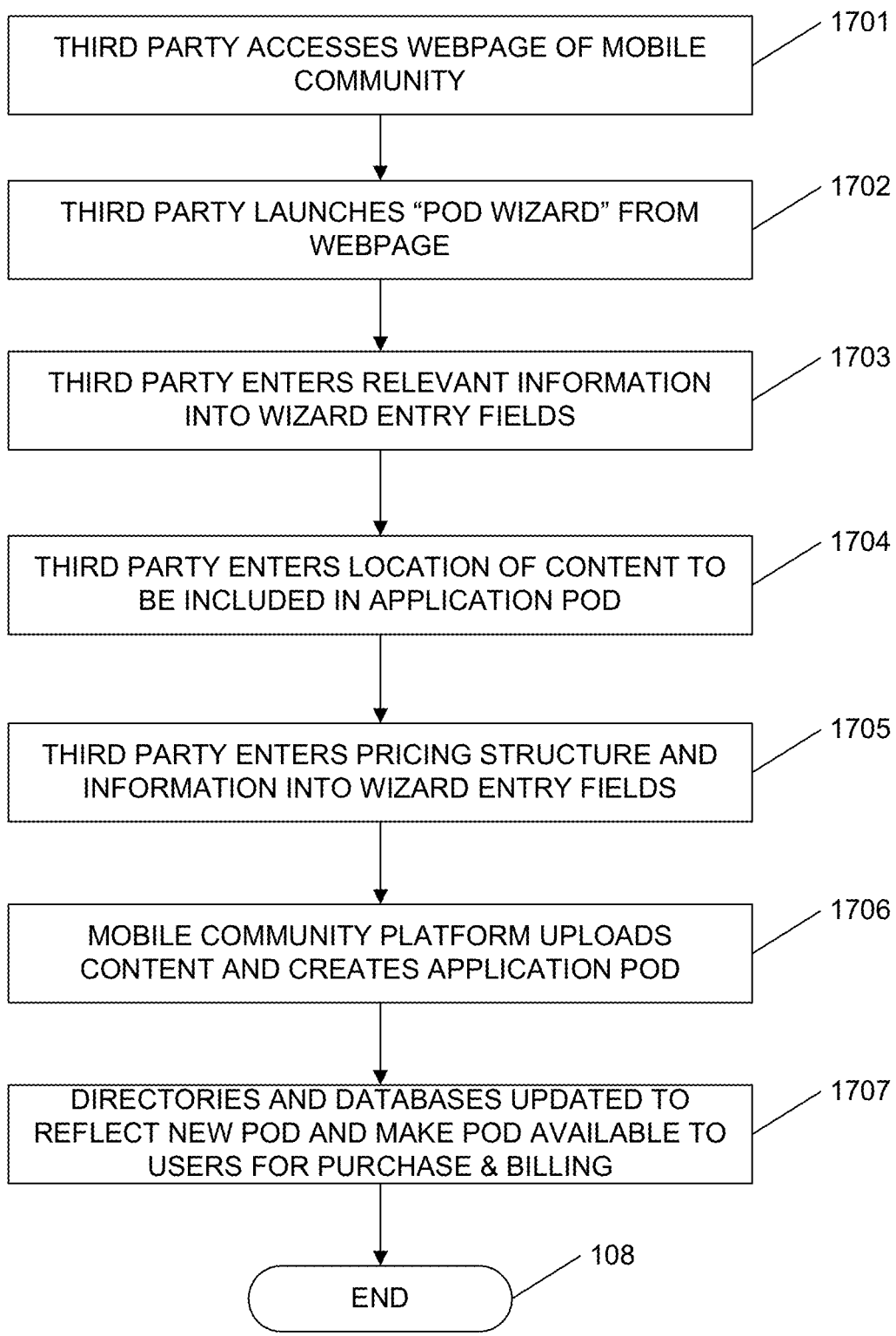
FIG. 17 is a flowchart illustrating an example process for automatic network-enabled application generation using third party content in accordance with one embodiment.

FIG. 17 is a flowchart illustrating an example method for creating a network-enabled application, or pod in which a third party can offer their content through the mobile community through an application pod that is automatically generated within the mobile community at the request of the third party. Turning to step 1701 of FIG. 17, a third party with content first accesses a web page provided by the mobile community to allow third parties to have an application pod automatically generated to offer their content for access, purchase and use by users of the mobile community. In step 1702, the third party launches an application, or "wizard", from the web page in order to begin the process of automatically generating an application pod for the third party. It can be appreciated that the wizard can be a series of web pages, a single web page, a program or applet, or other known method for entering information remotely via a network to a server. In step 1703, the third party enters relevant information into provided wizard entry fields. Such requested information can vary according to the type of content that the third party will be offering through the application pod. For example, the third party can be required to enter their name and contact information, with a description of the content they are offering. It can also be required for the third party to indicate the language in which the content is offered, and other information about the third party/author of the content, such as biographical information, history of development of other content by the third party, and other relevant information such as calendar events related to the third party (e.g. speaking engagements, appearances, etc.).

In step 1704, the third party enters the location of the content that is to be contained in the application pod into a provided wizard entry field. This can be a file location on the user's computer, and can be obtained through a browse button provided in the wizard page. Also, the location can be a remote location, such as a URL address of a blog site on which the third party maintains a blog. In this exemplary embodiment, wizard entry fields are provided for indicating the blog site (by name or URL address), and the user ID and the password of the third party for the blog site. Also, the entry fields are provided in the wizard for the third party to provide a unique blog name, and descriptions (short and long descriptions), as well as a location of logo graphic that is to be used in the mobile community in association with the application pod.

In step 1705, the third party enters the desired pricing structure and pricing information for the pod. The wizard provides entry fields for the third party to set the price that is charged to the user for subscribing to the pod, and also may allow the third party to send messages related to the subscribing users that are related to the application pod content. For example, in the case of a blog application pod, the wizard entries allow the third party to set the price that is billed to the user, as described above. In addition, the wizard provides entry fields to allow the third party to set a number of messages per day that can be sent by the third party to the subscribers of the application pod, and a price level for each message that is sent to a subscriber. In the case of a blog application pod, the third party can send messages to the subscriber to alert the subscriber that a new entry has been added to the blog. The third party then is able to review a representation of the appearance of the application pod before finally submitting the wizard entries for creation of the pod.

Next, in step 1706, the mobile community, through a server and computing devices, uploads the content from the content location provided by the third party in the wizard entries, and then creates an application pod which contains the uploaded content. The application pod is preferably created using a set of predetermined graphic functions and software functions to implement the pod frame and the functions commonly associated with a pod provided through the mobile community. These graphic and software functions used to create and support the application pod also provide community functions through which a user of the application pod can interact with other members of the mobile community regarding the application pod, and are discussed more fully below.

Once the application pod is created, the directories and databases of the mobile community are updated to implement the application pod and make it accessible to users of the mobile community for purchase, upon which the user is billed through the existing billing system of the user's respective cellular carrier, as described above. A user who has not purchased the application pod can see a limited view ("public view") of the application pod, while a user who has purchased the pod can view the entire pod content ("private view"). For example, in the case of a blog application pod, the public view of the application pod may only show the last blog entry, or may only show a limited amount of blog entry text, whereas users who have purchased the blog pod can view all entries in the blog via the private view of the pod.

FIG. 18 is a screen shot of an example of a wizard for automatically creating an application pod for a third party to offer a blog by the third party to users of the mobile community. As seen in FIG. 18, the wizard includes entry fields for entering the blog name, a short and a long description of the blog, and a mobile directory logo URL to indicate the location of the logo that the third party wants associated with the blog application pod. Also provided in the wizard are entry fields for the user to indicate the blog provider, and the user ID and password of the third party for the blog, so that it can be accessed and uploaded to the application pod.

FIG. 19 is another wizard page for automatically creating a blog application pod in which entry fields are provided for the third party to enter the price level that is to be charged to a user to subscribe to (purchase) the pod. Also provided are entry fields for the third party to set a maximum number of messages per day that can be sent by the third party to the subscribers of the application pod through the mobile community platform, and a price level for each message that is sent to a subscriber. As mentioned above, in the case of a blog application pod, the third party can send messages to the subscriber to alert the subscriber that a new entry has been added to the blog.

FIG. 20 is a further wizard page for automatically creating a blog application pod in which a representation of the appearance of the application pod is depicted for the user, along with pricing information, before finally submitting the wizard entries for creation of the application pod. If errors are present, or the third party wants to change the pod appearance or any pod related information, the third party can navigate back through the wizard to correct the necessary field entries.

FIG. 21 depicts an example of a blog application pod created from the wizard steps discussed above. The outer frame of the application pod, and associated functionality, is generated by predetermined sets of graphic and software functions, and the inner window is used to display the content that is uploaded from the location provided by the third party user. As seen in the blog pod shown in FIG. 21, a blog entry is displayed, and navigation tags are provided for the user of the blog pod to navigate to previous and subsequent blog entries.

In addition, community-based functionality can be implemented into the pod frame via menus, which allow the user to comment on the blog pod, share the blog pod with others, rate the blog pod, see other community users who have purchased the blog pod, see a list of other recommended application pods based on other users who have purchased the blog application pod, and obtain information about the third party that generated the application pod, and possibly contact the third party about the application pod.

Accordingly, an application pod can be automatically generated for a third party to offer content for access, purchase and use by mobile phone users within a community network. In this manner, the third party does not need the requisite skills, capabilities, time or resources to develop an application pod for delivery of the content to users of the community network. The third party can thereby easily take advantage of the automatic connection to community users and of the automatic billing through the users' respective cellular carriers as described above.

In another embodiment, a web "spider" application can be used by the mobile community platform to find web pages of third parties, such as musicians, artists, etc., identify the third party website with a unique code and then collect information and content from the website for use in the subsequent automatic generation of an application pod for that third party. For example, a musician may have a specific webpage hosted on a music website, such as "garagebands.com," on which information is provided about the musician and access is provided to music content of the musician. The musician may desire to extend the reach and accessibility of the musician's music content to a community of users, such as that provided by the mobile community discussed above. Thus, in certain embodiments, content such as music content and information from, e.g., the musician's existing web page(s), can be automatically pulled for subsequent automatic incorporation into the musician's application pod, thereby simplifying and accelerating the generation of an application pod custom tailored to the musician's music content and information. The musician can then be provided the opportunity to finalize creation of the pod by entering pricing and other information.

Figure 22:
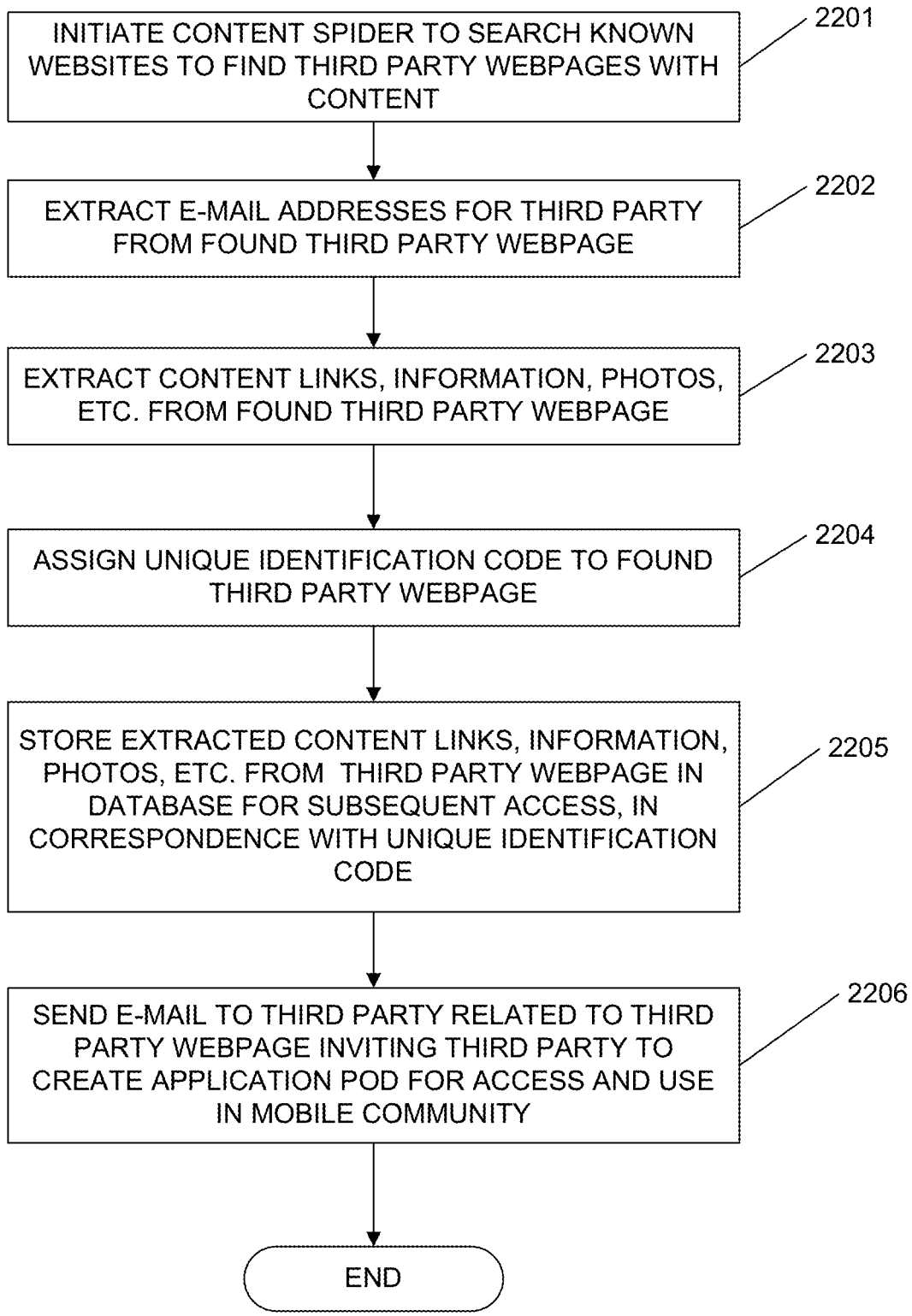
FIG. 22 is a flowchart illustrating an example method for obtaining content and information collected from a third party webpage for subsequent generation of an application pod in accordance with one embodiment.

FIG. 22 is a flowchart illustrating an example method for obtaining content and information collected from a third party webpage for subsequent generation of an application pod. In step 2201, the mobile community platform initiates a content-specific web spider application to search one or more known websites in order to find third party webpages that contain content. For example, the web spider application can be directed to find music-based webpages of third-party musicians that are hosted on a popular music website, such as garageband.com. In step 2202, the web spider application finds a webpage of a third party and extracts an email address for the third party, and saves the email address to a database in the mobile community platform. In the music example, the email address can be directed to a musician that "owns" the third party webpage, or to a band that "owns" the third party webpage.

Next, in step 2203, the web spider application can extract content links, information, photos, etc., from the third party web page. In the case of a musician or a band, the musician web page can include links to download music, links to watch video of the band, photos, description of the band and their music, scheduled events for the band, and other information. The mobile community platform, or the web spider application, can be configured to assign a unique identification code to the third party webpage in step 2204. The extracted content links, information, and photos, etc. from the third party webpage can then be stored in a database of the mobile community platform in correspondence with the assigned unique identification code (step 2205). In step 2206, the mobile community platform can send an email to the third party using the extracted email address from the third party webpage, wherein the email contains an invitation for the third party to create an application pod for access and use by members of the mobile community.

For example, if the third party is a musician, the email can contain an invitation to the musician to create a music application pod that will be hosted by the mobile community platform so that members of the mobile community can then access and/or purchase the music content of the musician, and related information such as description of the musician and music, photos, video, and other information through the music application pod. The process can then end.

Figure 23:
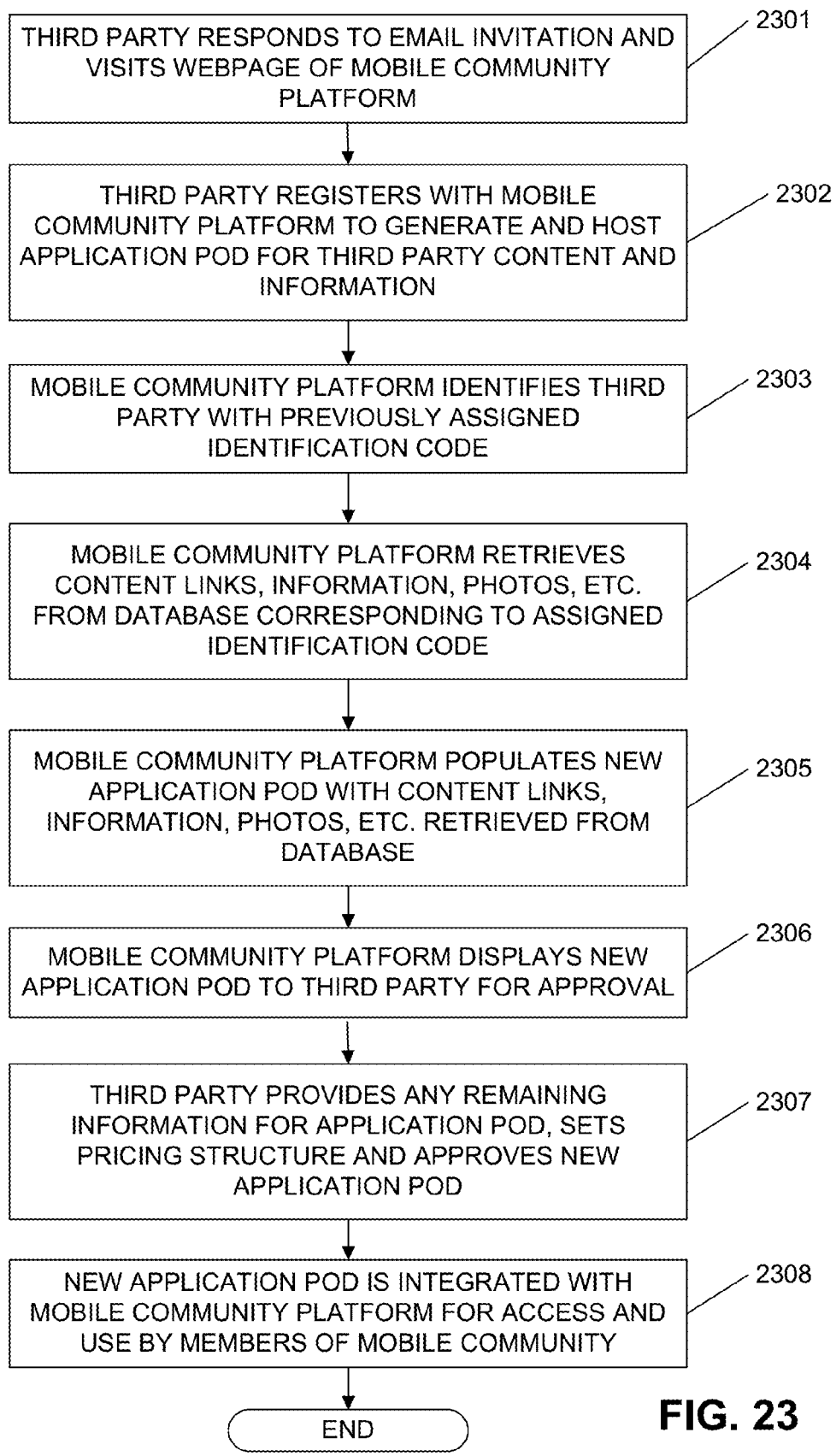
FIG. 23 is a flowchart illustrating an example method for generating an application pod that incorporates the content and information collected from a third party webpage and stored in the database of the mobile community platform in accordance with the process of FIG. 22.

FIG. 23 is a flowchart illustrating an example method for generating an application pod that incorporates the content and information collected from a third party webpage and stored in the database of the mobile community platform, as described above with respect to FIG. 22. In step 2301, the third party responds to the email invitation from the mobile community platform and visits the website of the mobile community platform. For example, the invitation can contain a link that takes the third party directly to the web page hosted by the mobile community platform for registering and generating new application pods, such as music pods.

In step 2302, the third party can register with the mobile community platform and agrees to generate a new application pod that is to be hosted by the mobile community platform, and that contains content and information related to the third party. During the registration process, the third party preferably provides contact information and agrees to terms and conditions of the mobile community platform. Next, in step 2303, the mobile community platform identifies the third party with the previously assigned unique identification code for the third party webpage. In this regard, the email invitation to the third party preferably contains the unique identification code in embedded form, so that it is easily retrieved when the third party responds to the invitation via a link in the email. Other methods can also be used to identify the third party with the previously assigned unique identification code, such as by corresponding the third party's email address or name, obtained during registration, to the unique identification code.

In step 2304, the mobile community platform can be configured to retrieve the stored content and information, such as content links, descriptions, photos, video, etc., that corresponds to the unique identification code from the database. The mobile community platform can then populate a new application pod, preferably in predetermined locations of a template, with the retrieved content and information from the database, such as content links, descriptions, photos, video, etc. (step 2305).

In step 2306, the mobile community platform can be configured to display the new application pod to the third party for approval. In the example of a musician, the new application pod can be populated with the description of the musician, photos, video and other information related to the musician, and links to the musician's music, all of which was previously extracted from the musician's pre-existing webpage hosted on the music website. In yet another embodiment, instead of extracting and storing the content and information of the third party before the third party begins the registration process, the mobile community platform can instead go to the webpage of the third party during the registration process of step 2302, and extract and store the content and information at that time.

In step 2307, the third party can modify or add to the new application pod, and can providing any other remaining desired information or content to the pod, and set the pricing structure for content, such as music, that can be purchased/accessed via the new application pod, and approve the application pod for use by members of the mobile community. In this regard, the new approved application pod can then be integrated with the mobile community platform for access and use by members of the mobile community (step 2308). The process of FIG. 23 can end.

In this manner, an alternative embodiment as described above with respect to FIGS. 22 and 23 provides a simple and efficient way to generate an application pod for a third party content provider, so that the content and related information of the third party can then be easily accessed, used and/or purchased by members of the mobile community platform. The alternative embodiment automatically generates a new application pod and populates it with content and information extracted from the third party's preexisting webpage, thereby requiring little effort by the third party in the generation process for the application pod.

In certain embodiments, content can be updated automatically as it becomes available. For example, the spider application can be configured to continually monitor found websites for new content and when new content is detected it can automatically upload it and make it available via a pod, e.g., which was automatically created as described above. In certain embodiments, a new message may need to be sent to the third party content provider in order to allow the third party content provider to approve the addition of the content and/or to update pricing for the additional content.

Further, when a third party content provider is sent an invitation to create a pod based on content that was automatically downloaded from the third party provider's website (step 2206), the third party provider can also be given the opportunity to add more content than what was downloaded, i.e., between steps 2306 and 2307.

It should also be noted that the content that is found and uploaded can come from another network, such as a social network. For example, a musician's MySpace cite can be "spidered" (step 2201) and the content can be downloaded and saved with a unique identification code (Steps 2202-2205). The spider can be configured to then send a message to the musician inviting the musician to create an application pod (step 2206). The message can include a link for the musician to set up a pod. The link can contain the unique identifier. When the musician follows the link, the musician can then set up the pod, or provide the information for automatic generation of the pod, e.g., in accordance with the process of FIG. 23, by approving the content, adding more content if desired, and selecting a price for pod. The pod can then be saved and made available as described. In this manner, a user can have access to a plurality of networks, e.g., social networks through the automatic generation of pods as described above.

While certain embodiments have been described above, it will be understood that the embodiments described are by way of example only. Accordingly, the systems and methods described herein should not be limited based on the described embodiments. Rather, the scope of the systems and methods described herein should only be limited in light of the claims that follow when taken in conjunction with the above description and accompanying drawings.

What is claimed is:

1. A method for integrating a network-enabled application with a platform having a plurality of users and a plurality of communication channels with a respective plurality of wireless network carriers, the method comprising:

a request receipt step of receiving, at the platform, a request from a third-party provider of content to integrate a network-enabled application with the platform, the network-enabled application configured to provide content associated with the third-party provider to the plurality of users;

a registration data receipt step of receiving, at the platform, a set of registration data corresponding to the network-enabled application from the third-party provider, the set of registration data including location information associated with the content and a link to an application location for accessing the network-enabled application;

a pricing structure data receipt step of receiving, at the platform, a set of pricing structure data corresponding to the network-enabled application from the third-party provider;

a database update step of updating, at the platform, a system database to include the set of registration data corresponding to the network-enabled application and to include the pricing structure data corresponding to the network-enabled application;

an enablement step of enabling the network-enabled application to be accessible to the plurality of users via a networked interface operated by the platform an invitation step of inviting, at the platform, the third-party provider to access the platform, and wherein the request received in the request receipt step is received in response to the invitation to the third-party provider; and a search step of automatically searching, at the platform, websites of third party content providers to identify content for the plurality of users, and wherein the invitation step is performed based on results of the search step.

* * * * *